United States Patent
Shikata et al.

(10) Patent No.: US 10,653,959 B2
(45) Date of Patent: May 19, 2020

(54) IMAGE PROCESSING APPARATUS AND IMAGE PROCESSING METHOD FOR DISPLAYING VIDEO IMAGE CAPABLE OF ACHIEVING IMPROVED OPERABILITY AND REALISM, AND NON-TRANSITORY STORAGE MEDIUM ENCODED WITH COMPUTER READABLE PROGRAM FOR CONTROLLING IMAGE PROCESSING APPARATUS

(75) Inventors: Hiromasa Shikata, Kyoto (JP); Shinji Okane, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 173 days.

(21) Appl. No.: 13/485,309

(22) Filed: May 31, 2012

(65) Prior Publication Data

US 2012/0307011 A1 Dec. 6, 2012

(30) Foreign Application Priority Data

Jun. 2, 2011 (JP) .................................. 2011-124265

(51) Int. Cl.
A63F 13/00 (2014.01)
A63F 13/5258 (2014.01)
A63F 13/42 (2014.01)

(52) U.S. Cl.
CPC .......... *A63F 13/5258* (2014.09); *A63F 13/42* (2014.09); *A63F 2300/6676* (2013.01); *A63F 2300/6684* (2013.01)

(58) Field of Classification Search
CPC ..... A63F 13/10; G06K 9/00348; H04N 7/012
(Continued)

(56) References Cited

U.S. PATENT DOCUMENTS 5,973,704 A 10/1999 Nishiumi et al.
6,323,895 B1 * 11/2001 Sata ................................ 348/39
(Continued)

FOREIGN PATENT DOCUMENTS

EP 1 125 609 8/2001
EP 1 312 400 5/2003
(Continued)

OTHER PUBLICATIONS

Notice of Opposition w/English translation dated Apr. 24, 2015 in European Patent Application No. 12170495.1 (86 pages total).
(Continued)

*Primary Examiner* — Jamie J Atala
*Assistant Examiner* — Joon Kwon
(74) *Attorney, Agent, or Firm* — Nixon & Vanderhye, P.C.

(57) ABSTRACT

An exemplary embodiment provides an image processing apparatus. The image processing apparatus includes a first object control unit for changing an orientation or a direction of movement of a first object in a three-dimensional space, a virtual camera control unit for determining a direction of shooting of the virtual camera in the three-dimensional space, and a display data generation unit for generating display data based on the determined direction of shooting of the virtual camera. The virtual camera control unit includes a detection unit for detecting whether the first object is hidden by another object when viewed from the virtual camera and a first following change unit for increasing a degree of causing the direction of shooting of the virtual camera to follow the orientation or the direction of movement of the first object based on a result of detection.

13 Claims, 14 Drawing Sheets

(58) Field of Classification Search
USPC .......................................... 348/39; 463/31, 3
See application file for complete search history.

(56) References Cited

U.S. PATENT DOCUMENTS

| | | | |
|---|---|---|---|
| 6,361,436 B1 | 3/2002 | Gouji et al. | |
| 6,377,277 B1* | 4/2002 | Yamamoto | A63F 13/10 |
| | | | 345/629 |
| 6,972,756 B1 | 12/2005 | Yamamoto | |
| 7,513,829 B2 | 4/2009 | Hayashida et al. | |
| 8,576,235 B1* | 11/2013 | Sumner | G06T 13/20 |
| | | | 345/473 |
| 2001/0024972 A1* | 9/2001 | Kitao | A63F 13/10 |
| | | | 463/33 |
| 2001/0035906 A1 | 11/2001 | Fukuda | |
| 2003/0096648 A1 | 5/2003 | Ohno et al. | |
| 2003/0166413 A1 | 9/2003 | Hayashida et al. | |
| 2004/0180709 A1* | 9/2004 | Takahashi et al. | 463/3 |
| 2004/0224761 A1* | 11/2004 | Nishimura | A63F 13/10 |
| | | | 463/33 |
| 2005/0206533 A1* | 9/2005 | Rogers | G01C 23/00 |
| | | | 340/979 |
| 2008/0170123 A1* | 7/2008 | Albertson | A63B 24/0003 |
| | | | 348/157 |
| 2008/0180438 A1* | 7/2008 | Sasaki et al. | 345/420 |
| 2009/0058856 A1 | 3/2009 | Kuroda et al. | |
| 2009/0131167 A1 | 5/2009 | Kawabata | |
| 2009/0163274 A1* | 6/2009 | Kando | A63F 13/10 |
| | | | 463/31 |
| 2010/0160040 A1* | 6/2010 | Ikeda | 463/31 |
| 2011/0244958 A1* | 10/2011 | Nimura | H04N 13/0239 |
| | | | 463/31 |

FOREIGN PATENT DOCUMENTS

| | | | | |
|---|---|---|---|---|
| EP | 1 925 347 B1 | 6/2010 | | |
| JP | 9-167260 | 6/1997 | | |
| JP | 10-305165 | 11/1998 | | |
| JP | 11-7543 | 1/1999 | | |
| JP | 2000288248 A | * 10/2000 | | A63F 13/00 |
| JP | 2001-273524 | 10/2001 | | |
| JP | 2003-058915 | 2/2003 | | |
| JP | 2003-135844 | 5/2003 | | |
| JP | 2003-150980 | 5/2003 | | |
| JP | 2003-290550 | 10/2003 | | |
| JP | 2004-290657 | 10/2004 | | |
| JP | 2007-054520 | 3/2007 | | |
| JP | 2009-059111 | 3/2009 | | |
| JP | 2009-064448 | 3/2009 | | |
| JP | 2010-142305 | 7/2010 | | |

OTHER PUBLICATIONS

McCabe et al., "A Virtual Cinematography System for First Person Shooter Games", Proc. of DIG2006, International Digital Games Conference, Sep. 27, 2006, pp. 25-35, 12 pages.

Christie et al., Camera Control in Computer Graphics, Eurographics, Springer Verlag, vol. 25, No. 3, Jan. 1, 2006, pp. 1-25, 26 pages.

Oct. 1, 2013 European Search Report in EP 12170495.1, 5 pages.

* cited by examiner

IMAGE PROCESSING APPARATUS AND IMAGE PROCESSING METHOD FOR DISPLAYING VIDEO IMAGE CAPABLE OF ACHIEVING IMPROVED OPERABILITY AND REALISM, AND NON-TRANSITORY STORAGE MEDIUM ENCODED WITH COMPUTER READABLE PROGRAM FOR CONTROLLING IMAGE PROCESSING APPARATUS

This nonprovisional application is based on Japanese Patent Application No. 2011-124265 filed with the Japan Patent Office on Jun. 2, 2011, the entire contents of which are hereby incorporated by reference.

FIELD

The invention generally relates to an image processing apparatus, an image processing method, and a non-transitory storage medium encoded with a computer readable program for controlling an image processing apparatus.

BACKGROUND AND SUMMARY

There is such an application that an object moves around in a two-dimensional/three-dimensional game space.

With such an application, a game space having a relatively narrow range with a player object of a player himself/herself (a character moving and operating in response to a player's operation) being located in the center is displayed on a television or a monitor as a normal game picture.

For example, in a 3D (3-Dimensional) game, a video image obtained by shooting, for example, from behind a player object operable by an operator with a camera at some distance therefrom has been displayed.

On the other hand, in a 3D game, when another object such as a background image or an enemy object is present between the player object and the camera or when another object or the like moves and cuts in between the player object and the camera, the player object cannot be shot with the camera and it becomes difficult to operate the player object.

In this regard, a technique has proposed such a scheme that, when presence of another object such as a wall is detected between a player object and a camera, the camera is moved to a position where a line of sight of the camera toward the player object is not interrupted by another object for shooting.

However, the technique has suffered from the problem of operability because the camera is moved based on an orientation of the wall when the wall is present between the player object and the camera.

An exemplary embodiment provides an image processing apparatus, an image processing method, and a non-transitory storage medium encoded with a computer readable program for controlling an image processing apparatus, for displaying a video image capable of achieving improved operability and realism.

An exemplary embodiment provides an image processing apparatus. The image processing apparatus is an image processing apparatus for displaying on a display, a video image obtained by shooting a first object and another object present in a three-dimensional space, and it includes a first object control unit for changing an orientation or a direction of movement of the first object in the three-dimensional space in a prescribed procedure and moving the first object in the orientation or the direction of movement, a virtual camera control unit for determining a direction of shooting of the virtual camera in the three-dimensional space so as to gradually follow the orientation or the direction of movement of the first object determined by the first object control unit and causing the virtual camera to shoot the first object in the direction of shooting, and a display data generation unit for generating display data for displaying on the display, the video image obtained by shooting the first object in the three-dimensional space based on the direction of shooting by the virtual camera determined by the virtual camera control unit. The virtual camera control unit includes a detection unit for detecting whether or not the first object is hidden by another object when viewed from the virtual camera and a first following change unit for increasing a degree of causing the direction of shooting of the virtual camera to follow the orientation or the direction of movement of the first object based on a result of detection by the detection unit.

According to the exemplary embodiment, during a normal operation, in such a situation that the first object is hidden by another object while the direction of shooting of the virtual camera gradually follows the orientation or the direction of movement of the first object, a degree of causing the direction of shooting of the virtual camera to follow the orientation or the direction of movement of the first object is increased to determine the direction of shooting of the virtual camera, so that the image processing apparatus having good operability without abruptness of control of the virtual camera at the time when the first object is hidden by another object can be provided. In addition, since the direction of shooting of the virtual camera follows the orientation or the direction of movement of the first object, the orientation or the direction of movement of the first object matches with a direction of depth of a screen and hence operability is good also in this sense.

In an exemplary embodiment, the detection unit detects whether or not another object is present between a position of the first object and a position of the virtual camera.

According to the exemplary embodiment, since whether or not another object is present between the position of the first object and the position of the virtual camera is detected, whether the first object is hidden by another object or not when viewed from the virtual camera can readily be detected.

In an exemplary embodiment, the virtual camera control unit further includes a second following change unit for further increasing a degree of causing the direction of shooting of the virtual camera to follow the orientation or the direction of movement of the first object when the first object moves forward.

According to the exemplary embodiment, by further increasing the degree of following the orientation or the direction of movement of the first object when the first object moves forward, in such a situation that the first object makes a turn around a wall and thereafter moves along the wall, the direction of shooting of the virtual camera follows sooner, so that realism can be increased.

In an exemplary embodiment, the first object control unit accepts a user's direction input and changes the orientation or a direction of movement of the object to a direction in accordance with the direction input, with a current direction of shooting of the virtual camera serving as the reference.

According to the exemplary embodiment, by changing the orientation or the direction of movement of the object to a direction in accordance with the direction input, in a case of a user's operation to intend forward movement, the direction of shooting of the virtual camera is soon matched with the orientation or the direction of movement of a player object, so that an image in a forward direction along the orientation or the direction of movement of the player object can quickly be checked and hence user's operability can further be improved.

In an exemplary embodiment, the virtual camera control unit further includes a change unit for changing a position of the virtual camera based on a position and the orientation or the direction of movement of the first object moved by the first object control unit and on the degree.

In an exemplary embodiment, the change unit changes the position of the virtual camera such that a distance from the position of the first object moved by the first object control unit is constant.

According to the exemplary embodiment, since change is made such that the position of the first object and the position of the virtual camera are constant, a feeling of distance from the object present in the three-dimensional space shot by the virtual camera does not change. Therefore, such a feeling as if a field of view of the first object were constant can be obtained and realism can be increased.

In an exemplary embodiment, the virtual camera control unit determines the direction of shooting of the virtual camera in the three-dimensional space in accordance with a first coefficient used for adjusting an angle so as to gradually follow the orientation or the direction of movement of the first object, and the first following change unit changes the first coefficient to a second coefficient greater than the first coefficient based on the result of detection by the detection unit.

In an exemplary embodiment, the first following change unit further includes a coefficient interpolation unit for changing to a third coefficient between the first coefficient and the second coefficient.

According to the exemplary embodiment, by providing the coefficient interpolation unit for changing to a third coefficient between the first coefficient and the second coefficient for adjusting an angle so as to gradually follow the orientation or the direction of movement of the first object, such adjustment that change in angle for adjusting the direction of shooting of the virtual camera is made smooth, a video image causing less uncomfortableness is displayed, and realism is increased can be made.

In an exemplary embodiment, the virtual camera control unit further includes a first object position prediction unit for predicting a position to which the first object may move based on the orientation or the direction of movement of the first object moved by the first object control unit and a prediction detection unit for detecting whether or not the first object at the position predicted by the first object position prediction unit may be hidden by another object when viewed from the virtual camera, and the first following change unit increases the degree of following the orientation or the direction of movement of the first object based on a result of detection by the prediction detection unit.

In an exemplary embodiment, the prediction detection unit detects whether or not another object may be present between the position of the virtual camera and a position distant by a prescribed distance from the position of the first object in the orientation or the direction of movement of the first object. It is noted that this "prescribed distance" is preferably changed in accordance with a moving speed of the first object. More specifically, when the moving speed of the first object is fast, this "prescribed distance" is preferably increased.

According to the exemplary embodiment, the degree of following can be changed before the first object is hidden by another object and the virtual camera is located at a position where hiding is avoided before such a situation as hiding is brought about. Therefore, a good field of view in the direction of shooting of the virtual camera can always be ensured and realism can be increased.

In an exemplary embodiment, the first object control unit changes the orientation or the direction of movement of the first object and moves the first object in the orientation or the direction of movement in response to a user's input, and moves the first object without changing the orientation or the direction of movement of the first object when the user's input is a prescribed input, and the virtual camera control unit further includes a second following change unit for further increasing a degree of causing the direction of shooting of the virtual camera to follow the orientation or the direction of movement of the first object when the user's input is the prescribed input.

According to the exemplary embodiment, when the user's input is a prescribed input, the first object is moved without changing the orientation or the direction of movement of the first object and the degree of causing the direction of shooting of the virtual camera to follow the orientation or the direction of movement of the first object. Thus, in a case of a user's operation to intend movement without changing the orientation or the direction of movement, the direction of shooting of the virtual camera is soon matched with the orientation or the direction of movement of a player object, so that an image along the orientation or the direction of movement of the player object can quickly be checked and hence user's operability can further be improved.

An exemplary embodiment provides an image processing apparatus. The image processing apparatus is an image processing apparatus for displaying on a display, a video image obtained by shooting a first object and another object present in a three-dimensional space, and it includes a first object control unit for changing an orientation or a direction of movement of the first object in the three-dimensional space in a prescribed procedure and moving the first object in the orientation or the direction of movement, a virtual camera control unit for determining a direction of shooting of the virtual camera in the three-dimensional space so as to follow the orientation or the direction of movement of the first object determined by the first object control unit and causing the virtual camera to shoot the first object in the direction of shooting, and a display data generation unit for generating display data for displaying on the display, the video image obtained by shooting the first object in the three-dimensional space based on the direction of shooting by the virtual camera determined by the virtual camera control unit, and the virtual camera control unit includes a following change unit for increasing a degree of causing the direction of shooting of the virtual camera to follow the orientation or the direction of movement of the first object when the first object moves forward.

According to the exemplary embodiment, when the first object moves forward, the degree of causing the direction of shooting of the virtual camera to follow the orientation or the direction of movement of the first object can be increased to determine the direction of shooting of the virtual camera, and the direction of shooting of the virtual camera follows forward movement of the first object sooner, so that realism can be increased.

An exemplary embodiment provides an image processing method. The image processing method is an image processing method for displaying on a display, a video image obtained by shooting a first object and another object present in a three-dimensional space, and it includes the steps of changing an orientation or a direction of movement of the first object in the three-dimensional space in a prescribed procedure, moving the first object in the orientation or the direction of movement, determining a direction of shooting of the virtual camera in the three-dimensional space so as to gradually follow the orientation or the direction of movement of the moved first object, shooting the first object in the direction of shooting, and generating display data for displaying on the display, the video image obtained by shooting the first object in the three-dimensional space based on the determined direction of shooting by the virtual camera, and the determining step includes the steps of detecting whether or not the first object is hidden by another object when viewed from the virtual camera and increasing a degree of causing the direction of shooting of the virtual camera to follow the orientation or the direction of movement of the first object based on a result of detection.

According to the exemplary embodiment, the steps of detecting whether or not the first object is hidden by another object when viewed from the virtual camera and increasing a degree of causing the direction of shooting of the virtual camera to follow the orientation or the direction of movement of the first object based on a result of detection can be provided to determine the direction of shooting of the virtual camera. By increasing the degree of following the orientation or the direction of movement of the first object, such a state as being hidden by another object can be avoided and a video image obtained by shooting a player object with the camera in accordance with change in line of sight of the operated player object can be displayed. Therefore, realism can further be increased.

An exemplary embodiment provides an image processing method. The image processing method is an image processing method for displaying on a display, a video image obtained by shooting a first object and another object present in a three-dimensional space, and it includes the steps of changing an orientation or a direction of movement of the first object in the three-dimensional space in a prescribed procedure, moving the first object in the orientation or the direction of movement, determining a direction of shooting of the virtual camera in the three-dimensional space so as to follow the orientation or the direction of movement of the moved first object, shooting the first object in the direction of shooting, and generating display data for displaying on the display, the video image obtained by shooting the first object in the three-dimensional space based on the determined direction of shooting by the virtual camera, and the determining step includes the step of increasing a degree of causing the direction of shooting of the virtual camera to follow the orientation or the direction of movement of the first object when the first object moves forward.

According to the exemplary embodiment, when the first object moves forward, the step of increasing the degree of causing the direction of shooting of the virtual camera to follow the orientation or the direction of movement of the first object can be provided to determine the direction of shooting of the virtual camera, and the direction of shooting of the virtual camera follows forward movement of the first object sooner, so that realism can be increased.

An exemplary embodiment provides a non-transitory storage medium encoded with a computer readable program for controlling an image processing apparatus and executable by a computer of the image processing apparatus. The image processing apparatus is for displaying on a display, a video image obtained by shooting an operation object and another object present in a three-dimensional space. The program for controlling an image processing apparatus causes the computer to perform processing including the steps of changing an orientation or a direction of movement of a first object in the three-dimensional space in a prescribed procedure, moving the first object in the orientation or the direction of movement, determining a direction of shooting of the virtual camera in the three-dimensional space so as to gradually follow the orientation or the direction of movement of the moved first object, shooting the first object in the direction of shooting, and generating display data for displaying on the display, the video image obtained by shooting the first object in the three-dimensional space based on the determined direction of shooting by the virtual camera, and the determining step includes the steps of detecting whether or not the first object is hidden by another object when viewed from the virtual camera and increasing a degree of causing the direction of shooting of the virtual camera to follow the orientation or the direction of movement of the first object based on a result of detection.

According to the exemplary embodiment, the steps of detecting whether or not the first object is hidden by another object when viewed from the virtual camera and increasing a degree of causing the direction of shooting of the virtual camera to follow the orientation or the direction of movement of the first object based on a result of detection can be provided to determine the direction of shooting of the virtual camera. By increasing the degree of following the orientation or the direction of movement of the first object, such a state as being hidden by another object can be avoided and a video image obtained by shooting a player object with the camera in accordance with change in line of sight of the operated player object can be displayed. Therefore, realism can further be increased.

An exemplary embodiment provides a non-transitory storage medium encoded with a computer readable program for controlling an image processing apparatus and executable by a computer of the image processing apparatus. The image processing apparatus is for displaying on a display, a video image obtained by shooting an operation object and another object present in a three-dimensional space. The program for controlling an image processing apparatus causes the computer to perform processing including the steps of changing an orientation or a direction of movement of a first object in the three-dimensional space in a prescribed procedure, moving the first object in the orientation or the direction of movement, determining a direction of shooting of the virtual camera in the three-dimensional space so as to follow the orientation or the direction of movement of the moved first object, shooting the first object in the direction of shooting, and generating display data for displaying on the display, the video image obtained by shooting the first object in the three-dimensional space based on the determined direction of shooting by the virtual camera, and the determining step includes the step of increasing a degree of causing the direction of shooting of the virtual camera to follow the orientation or the direction of movement of the first object when the first object moves forward.

According to the exemplary embodiment, when the first object moves forward, the step of increasing the degree of causing the direction of shooting of the virtual camera to follow the orientation or the direction of movement of the first object can be provided to determine the direction of shooting of the virtual camera, and the direction of shooting of the virtual camera follows forward movement of the first object sooner, so that realism can be increased.

The foregoing and other objects, features, aspects and advantages of the present invention will become more apparent from the following detailed description of the present invention when taken in conjunction with the accompanying drawings.

DETAILED DESCRIPTION OF NON-LIMITING EXAMPLE EMBODIMENTS

Figure 1:
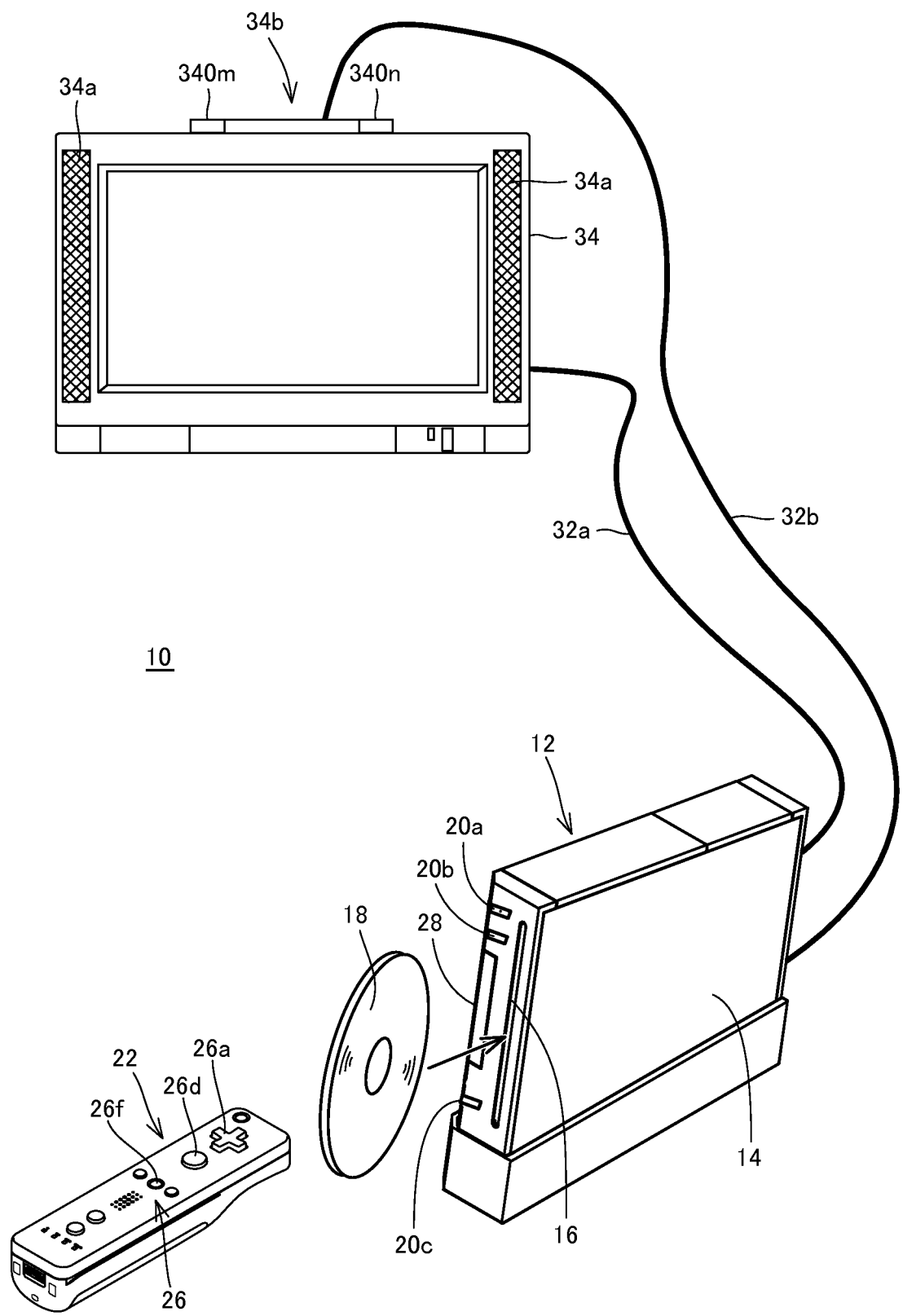
FIG. 1 shows an exemplary illustrative non-limiting configuration of a video game system 10 according to an exemplary embodiment.

Some embodiments will be described in detail with reference to the drawings. The same or corresponding elements in the drawings have the same reference characters allotted and description thereof will not be repeated.

<Configuration of Game Device>

FIG. 1 is a diagram for illustrating a configuration of a video game system 10 according to an embodiment.

Referring to FIG. 1, video game system 10 according to the embodiment includes a game device 12 representing one type of an image processing apparatus and a controller 22.

Game device 12 according to the present embodiment is designed to be able to communicate with at least one controller 22. In addition, game device 12 and each controller 22 are connected to each other through wireless communication. For example, wireless communication is implemented under Bluetooth® specifications, however, it may be implemented under other specifications such as infrared or wireless LAN. Alternatively, wire connection may be adopted.

Game device 12 includes a housing 14 in a substantially parallelepiped shape, and a disc slot 16 is provided in a front surface of housing 14. An optical disc 18 typically representative of a storage medium for storing a game program or the like is inserted in disc slot 16 and attached to a disc drive 54 (see FIG. 2) within housing 14. An LED and a light guide plate are arranged around disc slot 16, and the LED can illuminate in response to various processes.

In addition, in the front surface of housing 14 of game device 12, a power button 20a and a reset button 20b are provided in an upper portion thereof and an eject button 20c is provided in a lower portion thereof. Moreover, a connector cover 28 for an external memory card is provided between reset button 20b and eject button 20c, in the vicinity of disc slot 16.

An external memory card connector 62 (see FIG. 2) is provided inside connector cover 28 for external memory card, in which a not-shown external memory card (hereinafter simply also referred to as a "memory card") is inserted. The memory card is used for temporarily storing a game program or the like that is read from optical disc 18 and loaded, or it is used for storing (saving) game data of the game played with this video game system 10 (data of a game result or data while playing the game). The game data above, however, may be stored in an internal memory such as a flash memory 44 (see FIG. 2) provided inside game device 12, instead of the memory card. In addition, the memory card may be used as a back-up memory for the internal memory. Further, the game program or the like may be supplied (downloaded) to game device 12 from a server or the like connected to the network through a wire or wireless communication line. The game program or the like thus downloaded is stored in flash memory 44 (see FIG. 2) or a memory card provided in game device 12.

A general-purpose SD (Secured Digital) card may be employed as the memory card, however, other general-purpose memory cards such as a memory stick or a multimedia card (trademark) may also be employed.

An AV connector 58 (see FIG. 2) is provided on a rear surface of housing 14 of game device 12. An AV cable 32a is connected to AV connector 58, and game device 12, a monitor (display) 34 and a speaker 34a are connected to one another through this AV cable 32a. Monitor 34 and speaker 34a are typically implemented by a color television. AV cable 32a inputs a video signal from game device 12 to a video input terminal of the color television and inputs an audio signal to an audio input terminal. Therefore, for example, a game image of a three-dimensional (3D) video game is displayed on a screen of monitor 34 and stereophonic game sound such as game music or sound effect is output from left and right speakers 34a. In addition, a marker portion 34b having two infrared LEDs (markers) 340m and 340n is provided around monitor 34 (in the example shown in FIG. 1, on the top of monitor 34). Marker portion 34b is connected to game device 12 through a power cable 32b. Therefore, marker portion 34b is supplied with power from game device 12. Thus, markers 340m and 340n emit light and output infrared rays from the front of monitor 34.

Game device 12 is supplied with power by a general AC adapter (not shown). The AC adapter is inserted in an ordinary wall outlet at home and power supply for home (commercial power supply) is converted to a DC voltage signal suitable for driving game device 12. In other implementations, a battery may be employed as the power supply.

When the user plays some kind of a game (or another application, without limited to the game) with this video game system 10, the user initially turns on power of game device 12, selects appropriate optical disc 18 recording a program of a video game (or another application the user desires to play), and loads optical disc 18 to disc drive 54 of game device 12. Then, game device 12 starts execution of the video game or another application based on the program recorded on that optical disc 18. Alternatively, game device 12 may start execution of the video game or another application based on a program downloaded in advance from the server and stored in flash memory 44 (see FIG. 2) or the like.

The user operates controller 22 to provide an input to game device 12. For example, by operating any input unit 26, the user starts the game or another application. Further, by moving controller 22 itself other than operating input unit 26, the user can move a motion picture object (a player object) in a different direction or change a point of view of the user (a camera position) in a 3D game world.

In addition, controller 22 is provided with input unit (a plurality of buttons or switches) 26. Specifically, a cross key 26a, an A button 26d, and the like are provided. Cross key 26a is a four-directional push switch, and includes operation portions pointing to four directions shown with arrows, that is, front (or up), rear (or down), right, and left. As the user operates any one of these operation portions, a direction of movement of a character or an object (a player object) operable by the user can be indicated or a direction of movement of a cursor can be indicated.

A button 26d is a push-button switch, and it is used for causing a user character or a user object to perform an operation other than indication of a direction, that is, any action including hitting (punching), throwing, catching (acquiring), riding, jumping, or the like. For example, in an action game, jumping, punching, actuating a weapon, or the like can be indicated. Alternatively, in a role-playing game (RPG) or simulation RPG, acquiring of an item, selection and determination of a weapon or a command, or the like can be indicated.

Moreover, controller 22 has an image pick-up information operating unit 80 (see FIG. 3), and a light incident port of image pick-up information operating unit 80 is provided at the tip end surface of controller 22, although not shown.

The shape of controller 22 and the shape, the number, the installation position, and the like of input unit 26 are merely by way of example, and even variation as appropriate thereof is encompassed in the present embodiment.

Figure 2:
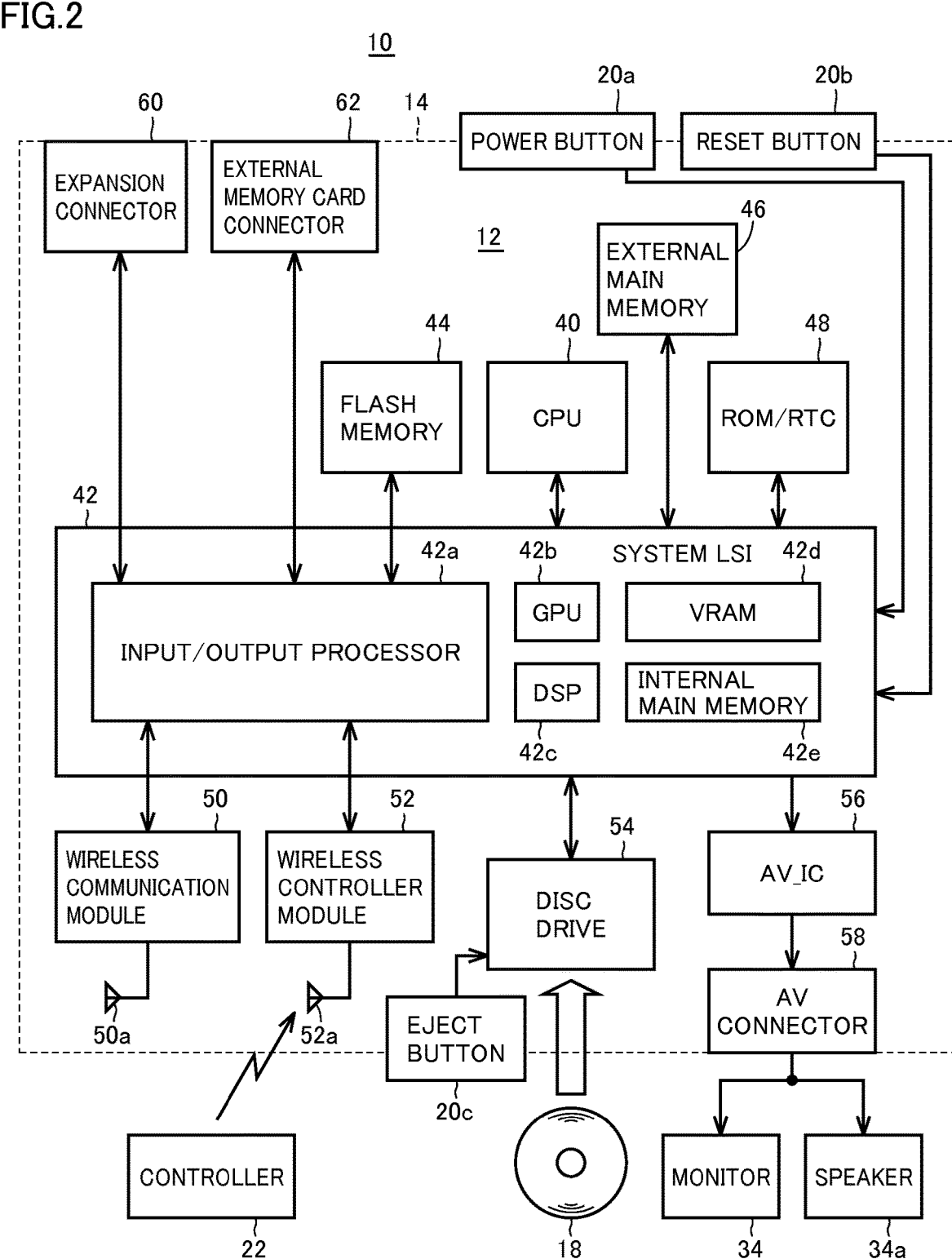
FIG. 2 shows an exemplary illustrative non-limiting block diagram showing an electrical configuration of video game system 10 according to the exemplary embodiment.

FIG. 2 is a block diagram showing an electrical configuration of video game system 10 shown in FIG. 1. Each component within housing 14 is mounted on a printed circuit board.

Referring to FIG. 2, game device 12 is provided with a CPU 40. This CPU 40 functions as a game processor. A system LSI 42 is connected to CPU 40. An external main memory 46, a ROM/RTC 48, disc drive 54, and an AV_IC 56 are connected to this system LSI 42.

External main memory 46 stores a program of various applications or various types of data, and it is used as a work area or a buffer area of CPU 40. ROM/RTC 48 is what is called a boot ROM, and a program for starting up game device 12 is incorporated therein and provided with a time counting circuit for counting time. Namely, CPU 40 obtains current time and day (year, month, day, and time) by referring to ROM/RTC 48. Disc drive 54 reads program data, object data, texture data or the like from optical disc 18, and writes such data in an internal main memory 42e or external main memory 46 which will be described later under the control of CPU 40.

System LSI 42 includes an input/output processor 42a, a GPU (Graphics Processor Unit) 42b, a DSP (Digital Signal Processor) 42c, a VRAM 42d, and internal main memory 42e, and these components are connected to one another through an internal bus.

Input/output processor (I/O processor) 42a transmits and receives data or downloads data. Transmission and reception and downloading of data will be described later in detail.

GPU 42b forms a part of rendering unit. Receiving a graphics command (an image generate instruction) from CPU 40, GPU 42b generates game image data in accordance with the command. It is noted that CPU 40 provides an image generation program necessary for generating game image data to GPU 42b, in addition to the graphics command.

As described above, VRAM 42d is connected to GPU 42b. GPU 42b obtains data necessary for GPU 42b to execute the image generate command (image data: data such as polygon data or texture data) by accessing VRAM 42d. It is noted that CPU 40 writes image data necessary for rendering in VRAM 42d, by utilizing GPU 42b. GPU 42b accesses VRAM 42d and creates the game image data for rendering.

In the present embodiment, an example where GPU 42b generates game image data is described. On the other hand, when some kind of application other than the game application is executed, GPU 42b generates image data for that application.

In addition, DSP 42c functions as an audio processor and generates audio data corresponding to sound, voice or music to be output from speaker 34a, by using sound data or sound waveform (tone) data stored in internal main memory 42e or external main memory 46.

The game image data and the audio data generated as described above are read by AV_IC 56 and output to monitor 34 and speaker 34a through AV connector 58. Therefore, a game picture is displayed on monitor 34 and sound (music) necessary for the game is output from speaker 34a.

In addition, flash memory 44, a wireless communication module 50 and a wireless controller module 52 as well as an expansion connector 60 and external memory card connector 62 are connected to input/output processor 42a. Moreover, an antenna 50a is connected to wireless communication module 50 and an antenna 52a is connected to wireless controller module 52.

Input/output processor 42a can communicate with another game device or various servers connected to the network through wireless communication module 50. Input/output processor 42a, however, can also communicate directly with another game device without communicating via the network.

In addition, input/output processor 42a receives input data transmitted from controller 22 through antenna 52a and wireless controller module 52, and causes internal main memory 42e or external main memory 46 to store (temporarily store) the input data in a buffer area thereof. After the input data is used in game processing by CPU 40, it is erased from the buffer area.

In the present embodiment, as described above, wireless controller module 52 communicates with controller 22 under Bluetooth® specifications.

In addition, expansion connector 60 and external memory card connector 62 are connected to input/output processor 42*a*. Expansion connector 60 is a connector for an interface such as a USB or an SCSI, and a medium such as an external storage medium or a peripheral device such as another controller can be connected. In addition, a wired LAN adapter may be connected to expansion connector 60 and wired LAN can be utilized instead of wireless communication module 50. An external storage medium such as a memory card can be connected to external memory card connector 62. Therefore, for example, input/output processor 42*a* can access the external storage medium to store data therein or to read data therefrom, through expansion connector 60 or external memory card connector 62.

As shown also in FIG. 1, game device 12 (housing 14) is provided with power button 20*a*, reset button 20*b* and eject button 20*c*. Power button 20*a* is connected to system LSI 42. When power button 20*a* is turned on, system LSI 42 supplies power to each component in game device 12 through a not-shown AC adapter and sets a mode in a normally powered state (referred to as a normal mode). On the other hand, when power button 20*a* is turned off, system LSI 42 supplies power only to some components in game device 12 and sets a mode in which power consumption is minimized (hereinafter also referred to as a "stand-by mode"). In the present embodiment, when the stand-by mode is set, system LSI 42 indicates stop of power supply to components other than input/output processor 42*a*, flash memory 44, external main memory 46, ROM/RTC 48, wireless communication module 50, and wireless controller module 52. Therefore, the stand-by mode refers to a mode in which CPU 40 does not execute an application.

Though power is supplied to system LSI 42 even in the stand-by mode, power consumption is lowered by avoiding drive of GPU 42*b*, DSP 42*c* and VRAM 42*d* as a result of stop of supply of a clock thereto.

In addition, a fan for expelling heat of an IC such as CPU 40 or system LSI 42 is provided in housing 14 of game device 12. In the stand-by mode, this fan is also stopped. If the user does not wish to use the stand-by mode, setting for not using the stand-by mode may be made so that power supply to all circuit components is completely stopped as power button 20*a* is turned off.

Reset button 20*b* is also connected to system LSI 42. When reset button 20*b* is pressed, system LSI 42 re-starts a start-up program of game device 12. Eject button 20*c* is connected to disc drive 54. When eject button 20*c* is pressed, optical disc 18 is ejected from disc drive 54.

Figure 3:
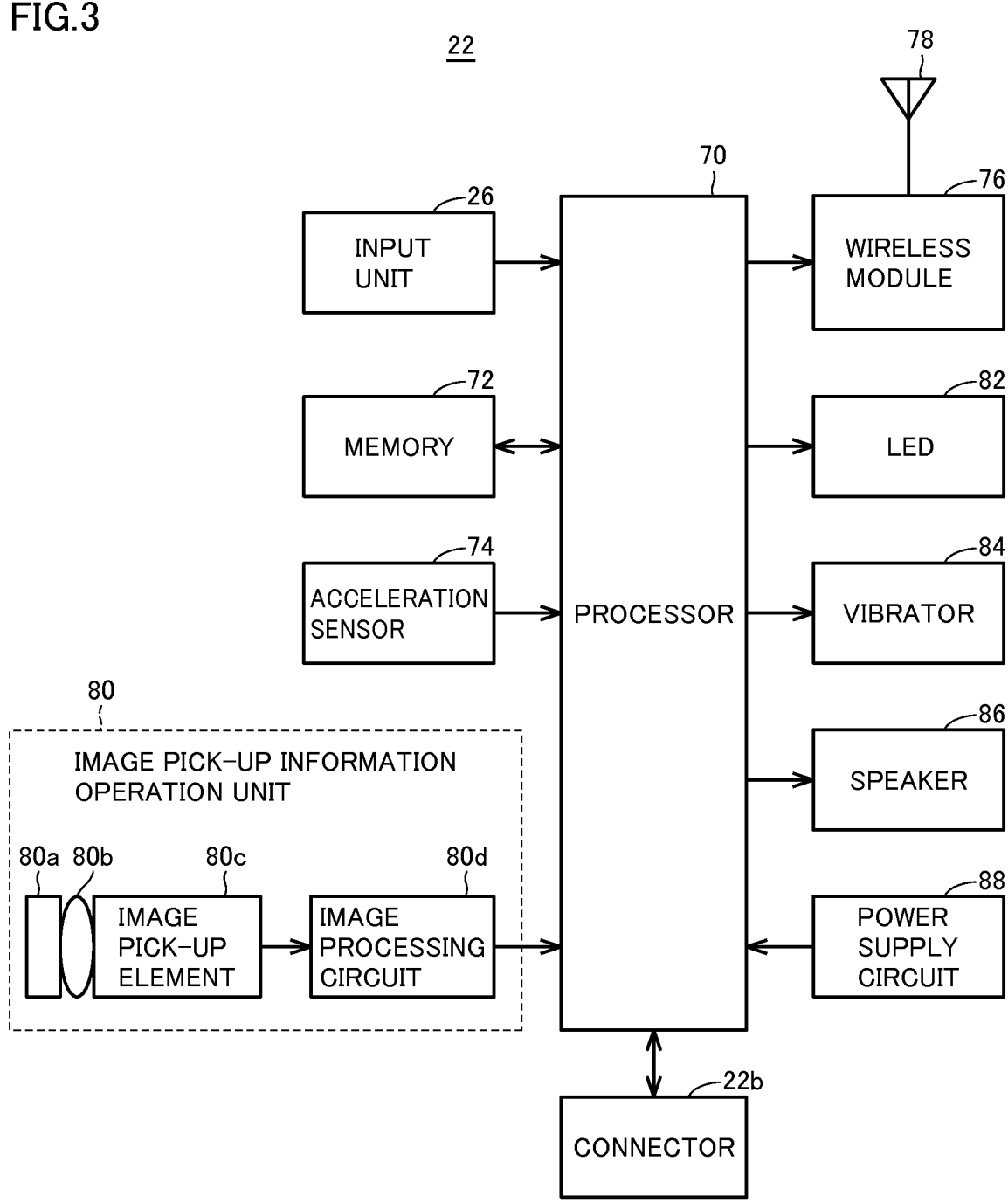
FIG. 3 shows an exemplary illustrative non-limiting block diagram showing an electrical configuration of a controller 22 according to the exemplary embodiment.

FIG. 3 is a block diagram showing an electrical configuration of controller 22.

Referring to FIG. 3, controller 22 includes a processor 70, to which an external expansion connector 22*b*, input unit 26, a memory 72, an acceleration sensor 74, a wireless module 76, image pick-up information operating unit 80, an LED 82 (an indicator 22*c*), a vibrator 84, a speaker 86, and a power supply circuit 88 are connected through an internal bus (not shown). In addition, an antenna 78 is connected to wireless module 76.

Processor 70 is responsible for overall control of controller 22, and it transmits (inputs) as input data, information input from input unit 26, acceleration sensor 74 and image pick-up information operating unit 80 (input information) to game device 12 through wireless module 76 and antenna 78. Here, processor 70 uses memory 72 as a work area or a buffer area.

An operation signal (operation data) from input unit 26 (26*a*, 26*d*, and the like) described above is input to processor 70, which once causes memory 72 to store the operation data.

In addition, acceleration sensor 74 detects each acceleration in three axes of a vertical direction (direction of y-axis), a horizontal direction (direction of x-axis) and a front-rear direction (direction of z-axis) of controller 22. Acceleration sensor 74 is typically a capacitance-type acceleration sensor, however, a sensor of another type may be employed.

For example, acceleration sensor 74 detects acceleration for each of the x-axis, the y-axis and the z-axis (ax, ay, az) every first prescribed time, and inputs the detected acceleration data (acceleration data) to processor 70. For example, acceleration sensor 74 detects acceleration in the direction of each axis in a range from −2.0 G to 2.0 G (G represents acceleration of gravity; to be understood similarly hereinafter). Processor 70 detects acceleration data provided from acceleration sensor 74 every second prescribed time, and causes memory 72 to once store the acceleration data. Processor 70 creates input data including at least one of operation data, acceleration data and marker coordinate data which will be described later, and transmits the created input data to game device 12 every third prescribed time (for example, 5 msec.).

Here, a person skilled in the art could readily understand from the description in the present specification that further information on controller 22 can be estimated or calculated (determined) as a result of processing by such a computer as the processor of game device 12 (such as CPU 40), the processor of controller 22 (such as processor 70) or the like, based on the acceleration data output from acceleration sensor 74.

For example, in an example where a computer side performs processing on the premise that the controller including a one-axis acceleration sensor is in a static state, that is, where it is assumed that acceleration detected by the acceleration sensor consists of only acceleration of gravity, if controller 22 is actually in a static state, whether an attitude of controller 22 is inclined with respect to the direction of gravity or how it is inclined can be determined based on the detected acceleration data. Specifically, if a state that an axis detected by the acceleration sensor is in the vertically downward direction is defined as the reference, inclination can be determined only based on whether 1 G (acceleration of gravity) is applied or not, and magnitude of inclination can be determined based on magnitude of acceleration of gravity.

Alternatively, in a case of a multi-axis acceleration sensor, acceleration data in each axis is further processed so that a degree of inclination with respect to the direction of gravity can be known in further detail. In such a case, processor 70 may perform processing for calculating data of an angle of inclination of controller 22 based on outputs from the acceleration sensor, however, processing may be such that approximate inclination can be estimated based on outputs from the acceleration sensor without processing for calculating inclination angle data. Thus, by combining the acceleration sensor with the processor, an inclination, an attitude or a position of controller 22 can be determined.

On the other hand, in an example where the acceleration sensor is premised on a dynamic state, acceleration in accordance with movement of the acceleration sensor is detected in addition to a component of acceleration of gravity. Therefore, by eliminating the component of acceleration of gravity with prescribed processing, a direction of movement or the like can be determined. Specifically, when controller 22 having the acceleration sensor is moved in a manner dynamically accelerated by a user's hand, the acceleration data generated by the acceleration sensor is processed so that various movements and/or positions of controller 22 can be calculated.

Even in an example where the acceleration sensor is premised on a dynamic state, inclination with respect to the direction of gravity can be determined by eliminating acceleration in accordance with movement of the acceleration sensor with prescribed processing. In another embodiment, the acceleration sensor may incorporate an embedded signal processing device or a dedicated processing device of another type for subjecting an acceleration signal (acceleration data) output from contained acceleration detection unit to desired processing prior to output of acceleration data to processor 70. For example, an embedded or dedicated processing device may convert sensed acceleration data into a corresponding inclination angle (or other preferred parameters) if the acceleration sensor serves to detect static acceleration (for example, acceleration of gravity).

Wireless module 76 modulates a carrier wave at a prescribed frequency with input data and emits the resultant weak radio signal from antenna 78, using, for example, the Bluetooth® technique. Namely, input data is modulated by wireless module 76 into a weak radio signal and transmitted from antenna 78 (controller 22). This weak radio signal is received by wireless controller module 52 provided in game device 12 described above. The received weak radio wave is subjected to demodulation and decoding processing, and consequently, game device 12 (CPU 40) can obtain input data from controller 22. Then, CPU 40 performs game processing in accordance with the obtained input data and the program (game program).

In addition, as described above, controller 22 is provided with image pick-up information operating unit 80. Image pick-up information operating unit 80 is constituted of an infrared filter 80a, a lens 80b, an image pick-up element 80c, and an image processing circuit 80d. Infrared filter 80a allows passage of only infrared of light incident from the front of controller 22. As described above, markers 340m and 340n arranged in the vicinity of (around) a display screen of monitor 34 are infrared LEDs for outputting infrared rays from the front of monitor 34. Therefore, an image of markers 340m and 340n can more accurately be picked up by providing infrared filter 80a. Lens 80b collects the infrared rays that have passed through infrared filter 80a and directs the infrared rays toward image pick-up element 80c. Image pick-up element 80c is implemented by a solid-state image pick-up element such as a CMOS sensor or a CCD, and it picks up an image of the infrared rays collected by lens 80b. Therefore, image pick-up element 80c picks up an image only of the infrared rays that have passed through infrared filter 80a to generate image data. An image picked up by image pick-up element 80c is hereinafter referred to as a picked-up image. The image data generated by image pick-up element 80c is processed by image processing circuit 80d. Image processing circuit 80d calculates a position of an image pick-up object (markers 340m and 340n) within the picked-up image and outputs each coordinate value indicating the position to processor 70 as the image pick-up data every fourth prescribed time. Using the image data of the picked-up image including the image pick-up object, image processing circuit 80d calculates a coordinate indicating a position of each marker 340m, 340n in the picked-up image (a marker coordinate). As the distance between target images in the picked-up image is varied depending on a distance between controller 22 and markers 340m, 340n, game device 12 can obtain the distance between controller 22 and markers 340m, 340n by calculating the distance between the two marker coordinates.

Figure 4:
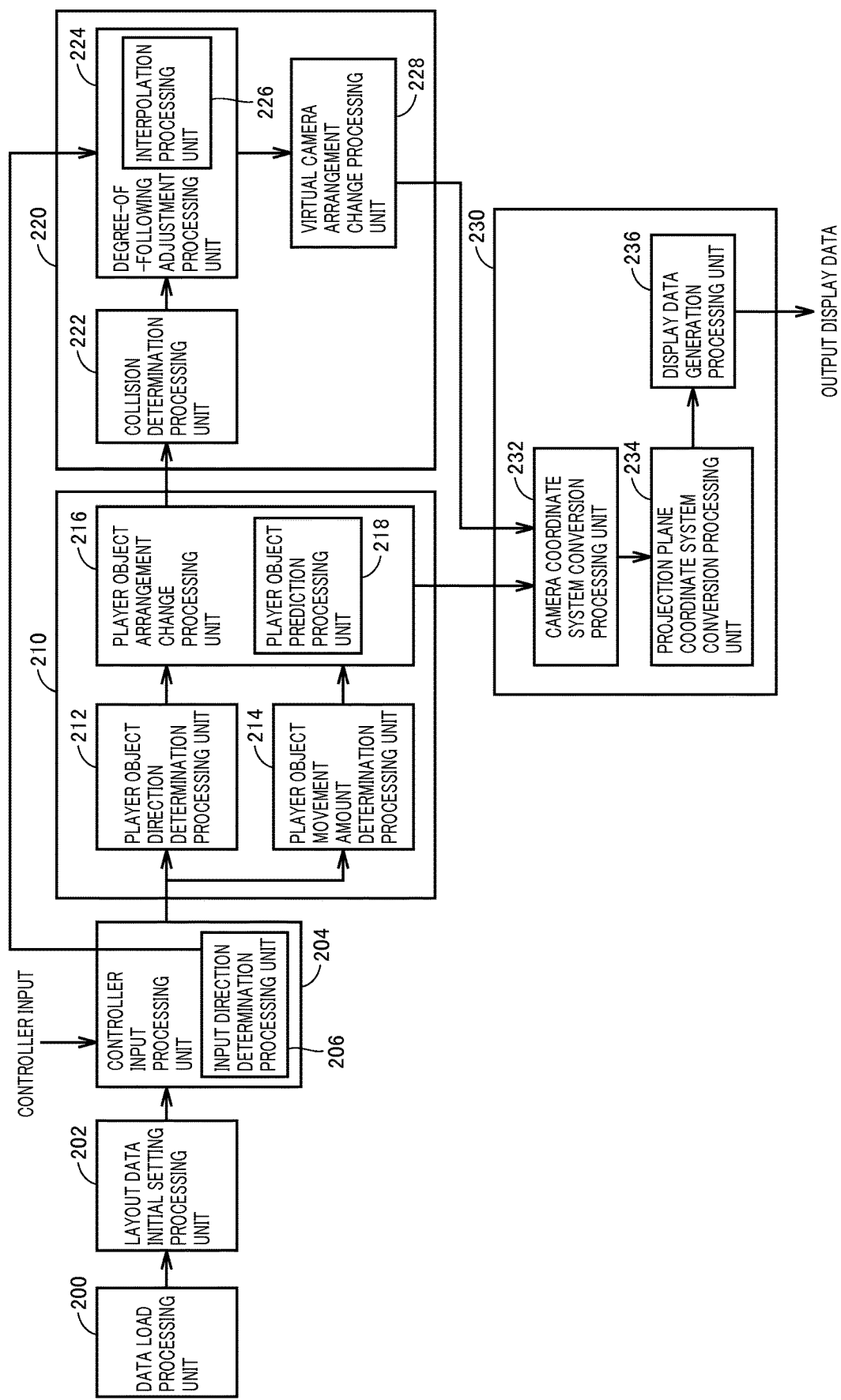
FIG. 4 shows an exemplary illustrative non-limiting diagram for illustrating details of a functional block realized by a CPU 40 and a GPU 42b of a game device 12 according to the exemplary embodiment.

FIG. 4 is a diagram for illustrating details of a functional block realized by CPU 40 and GPU 42b of game device 12 according to the embodiment.

Referring to FIG. 4, in the present example, a case where a data load processing unit 200, a layout data initial setting processing unit 202, a controller input processing unit 204, a player object control processing unit 210, a virtual camera control processing unit 220, and a data generation processing unit 230 are provided is shown here by way of example.

Specifically, data load processing unit 200, layout data initial setting processing unit 202, controller input processing unit 204, player object control processing unit 210, and virtual camera control processing unit 220 are functions realized by CPU 40. Meanwhile, data generation processing unit 230 is a function realized by GPU 42b. It is noted that each function is realized by multi-task control as necessary.

Specific description will be provided below. Data load processing unit 200 loads program data or the like read from optical disc 18 into external main memory 46 or internal main memory 42e as necessary.

Layout data initial setting processing unit 202 reads the stored and loaded object data from external main memory 46 or internal main memory 42e and arranges the data at an initial coordinate in the world coordinate system.

Controller input processing unit 204 accepts input data which is a controller input operated through controller 22 and outputs operation input data obtained by analysis thereof to player object control processing unit 210 together with data on the initial coordinate of the object data. When analysis is not required, the accepted input data may be output as it is to player object control processing unit 210.

Here, controller input processing unit 204 includes an input direction determination processing unit 206, and input direction determination processing unit 206 determines whether operation input data is an input of a prescribed direction or not. Though description will be provided later, when it is determined that an input of a prescribed direction has been provided, a degree-of-following adjustment processing unit 224 is instructed to change the degree of following to a prescribed level.

Player object control processing unit 210 includes a player object direction determination processing unit 212, a player object movement amount determination processing unit 214, and a player object arrangement change processing unit 216.

Player object direction determination processing unit 212 determines an orientation or a direction of movement of a player object in accordance with the operation input data.

Player object movement amount determination processing unit 214 determines an amount of movement of the player object in accordance with the operation input data.

Player object arrangement change processing unit 216 changes a position of the player object based on the orientation or the direction of movement of the player object determined by player object direction determination processing unit 212 and the amount of movement determined by player object movement amount determination processing unit 214. Then, data on a position or the like of the player object that has been subjected to change processing is output to virtual camera control processing unit 220.

Here, player object arrangement change processing unit 216 includes a player object prediction processing unit 218, and player object prediction processing unit 218 predicts a position to which movement will be made next in accordance with the orientation or the direction of movement of the player object. Though description will be provided later, player object prediction processing unit 218 predicts a position resulting from movement by a prescribed distance from an original position of the player object from which change is to be made in accordance with the orientation or the direction of movement of the player object.

Virtual camera control processing unit 220 includes a collision determination processing unit 222, a degree-of-following adjustment processing unit 224, and a virtual camera arrangement change processing unit 228.

Collision determination processing unit 222 determines whether or not the player object arranged at the position changed by player object arrangement change processing unit 216 is hidden by another object when viewed from the virtual camera.

Specifically, based on a position of the player object changed by player object arrangement change processing unit 216 and a current position of the virtual camera, whether another object is present therebetween or not is determined. Collision determination processing unit 222 outputs a determination result to degree-of-following adjustment processing unit 224.

Degree-of-following adjustment processing unit 224 adjusts the degree of following indicating a degree of extent that the virtual camera follows movement of the player object based on the result of determination by collision determination processing unit 222.

Specifically, when it is determined that another object is present based on the result of determination by collision determination processing unit 222, the degree of following is increased. On the other hand, when it is determined that another object is not present based on the result of determination by collision determination processing unit 222, the degree of following is not changed. Namely, a normal value is set. The orientation and the position where the virtual camera is arranged are changed in accordance with the degree of following. Setting of a position where the virtual camera is arranged will be described later.

Here, degree-of-following adjustment processing unit 224 includes an interpolation processing unit 226. Though description will be provided later, interpolation processing unit 226 performs processing for interpolating a value for a coefficient of following involved with adjustment of the degree of following to a value between a minimum value and a maximum value.

Virtual camera arrangement change processing unit 228 changes the orientation (the direction of shooting) and the position of the virtual camera based on data on the orientation or the direction of movement, the position, and the like of the player object changed by player object arrangement change processing unit 216 as well as the degree of following. Change in orientation (direction of shooting) and position of the virtual camera will be described later.

Data generation processing unit 230 includes a camera coordinate system conversion processing unit 232, a projection plane coordinate system conversion processing unit 234, and a display data generation processing unit 236.

Camera coordinate system conversion processing unit 232 outputs to projection plane coordinate system conversion processing unit 234, coordinate data obtained by conversion to the camera coordinate system based on data on the changed position or the like of the player object output from player object control processing unit 210 and data on the changed position or the like of the virtual camera output from virtual camera control processing unit 220.

Projection plane coordinate system conversion processing unit 234 carries out coordinate conversion onto a projection plane and outputs coordinate data on the projection plane to display data generation processing unit 236.

Display data generation processing unit 236 generates display data by using texture data or the like based on the coordinate data and outputs the display data.

Figure 5:
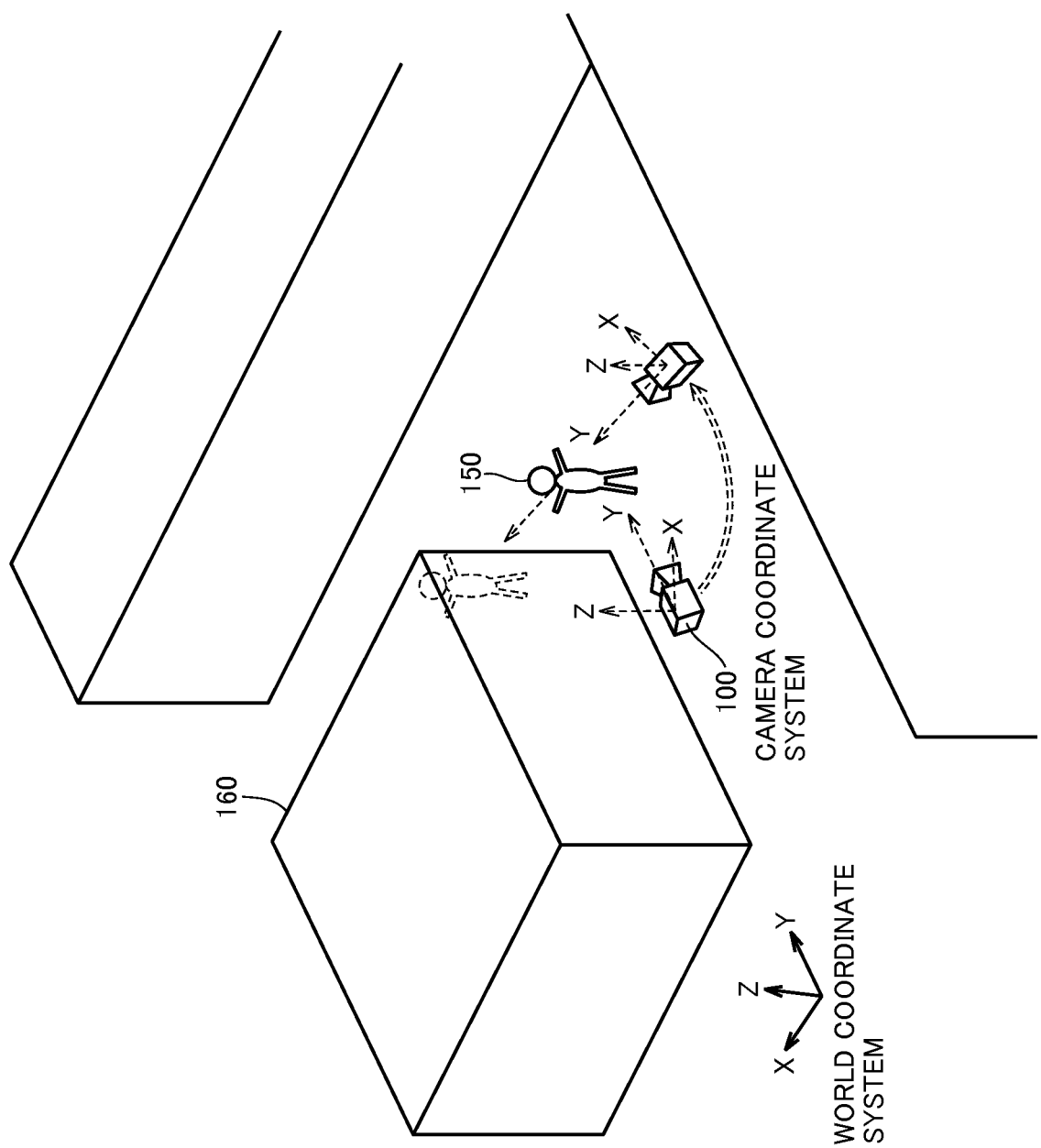
FIG. 5 shows an exemplary illustrative non-limiting diagram for illustrating three-dimensional world coordinate system and camera coordinate system representing game spaces according to the exemplary embodiment.

FIG. 5 is a diagram for illustrating three-dimensional world coordinate system and camera coordinate system representing game spaces according to the embodiment.

Referring to FIG. 5, a case where a topographic object 160 and a player object 150 are arranged at initial coordinates in the three-dimensional world coordinate system is shown here.

A virtual camera 100 is arranged at a position distant by a prescribed distance from player object 150 and shoots player object 150.

When an orientation or a direction of movement of player object 150 is not changed, a state that the orientation or the direction of movement of player object 150 and the direction of shooting of the virtual camera match with each other is maintained. Namely, the line of sight of player object 150 is in the same orientation as the direction of shooting of the virtual camera, and a game operation from the point of view of player object 150 is allowed.

When the orientation or the direction of movement of player object 150 is changed, the direction of shooting of virtual camera 100 is determined so as to gradually follow the orientation or the direction of movement of player object 150. Even when the orientation or the direction of movement of player object 150 is greatly changed, by causing the direction of shooting of virtual camera 100 to gradually follow the orientation or the direction of movement of the player object, a game operation along the line of sight of player object 150 can be performed while visually induced motion sickness (3D sickness) caused by sudden screen change is suppressed.

In the present example, a case where the orientation or the direction of movement of player object 150 is changed to the left with the orientation or the direction of movement of player object 150 having been set to forward is shown. Namely, such a situation that player object 150 makes a turn to the left at a corner of a wall object representing topographic object 160 is assumed.

When player object 150 moves by making a turn to the left at the corner of the wall object, player object 150 is hidden by the wall object representing topographic object 160, when viewed from virtual camera 100. Specifically, though description will be provided later, such a state that, based on a position to which player object 150 moves and a current position of the virtual camera, presence of topographic object 160 therebetween is determined is established.

In this case, since the wall object representing topographic object 160 is present between virtual camera 100 and player object 150, player object 150 cannot be shot. Therefore, the position of virtual camera 100 should be changed to a position where player object 150 can be shot.

In the present embodiment, for example in a case where topographic object 160 hides player object 150 when viewed from virtual camera 100, the degree of causing the direction of shooting of virtual camera 100 to follow the orientation or the direction of movement of player object 150 (the degree of following) is increased to determine the position and the direction of shooting of virtual camera 100.

It is noted that, with regard to an image displayed on monitor 34, an image obtained by shooting player object 150 or the like with the determined position and direction of shooting of the virtual camera is displayed.

Figure 6:
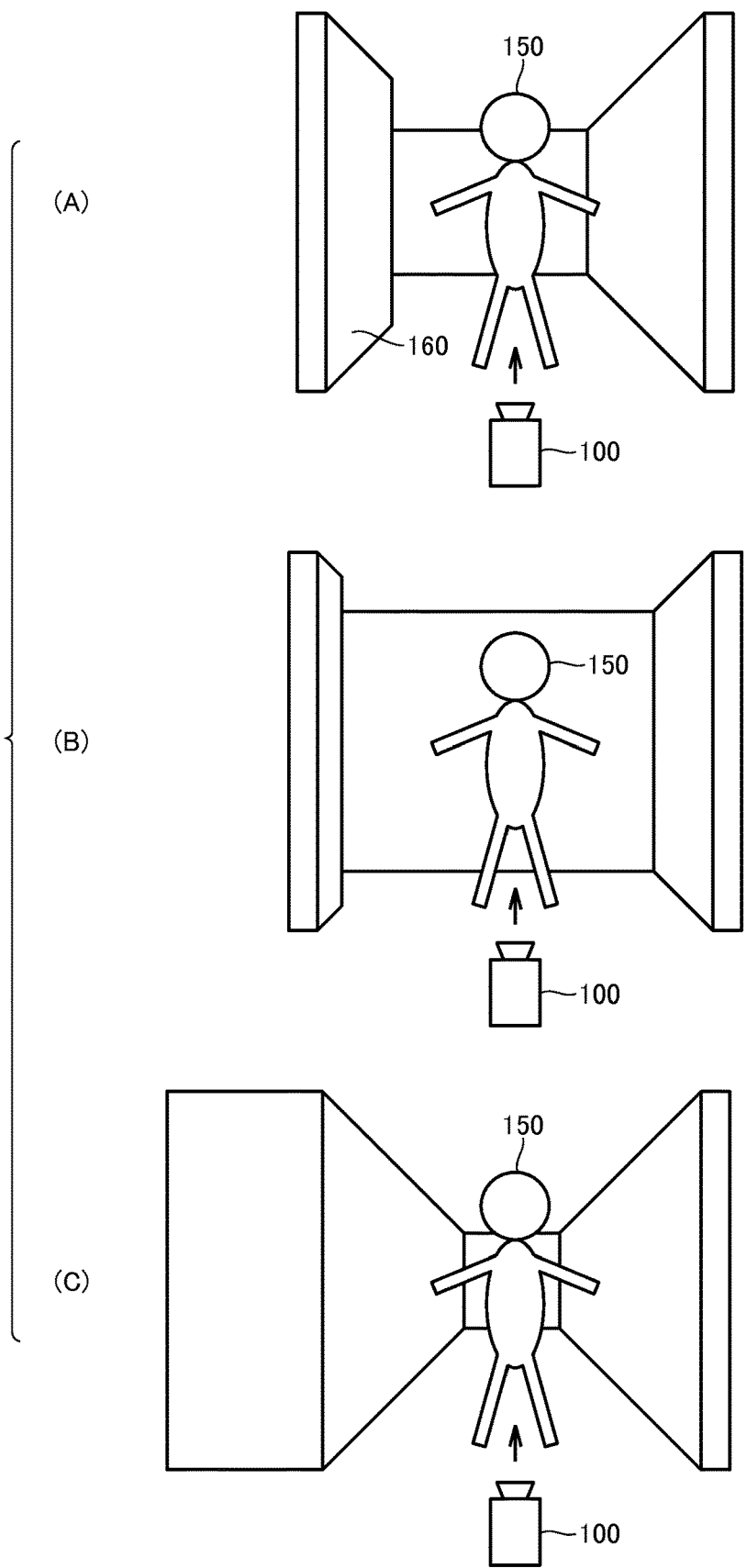
FIG. 6 shows an exemplary illustrative non-limiting diagram for illustrating one example of a game image displayed on a monitor 34 according to the exemplary embodiment.

FIG. 6 is a diagram for illustrating one example of a game image displayed on monitor 34 according to the embodiment.

Referring to FIGS. 6(A) to 6(C), an image obtained by shooting player object 150 with virtual camera 100 is shown here.

Referring to FIG. 6(A), such a situation that player object 150 is surrounded by topographic object 160 is shown here. Player object 150 can be operated by using controller 22, and a case of display where there is a passage in the front of the orientation or the direction of movement of the player object, forward and right directions of the passage are dead ends, and the passage continues to the left is shown here.

Referring to FIG. 6(B), such a state that forward movement is made without change in orientation or direction of movement of the player object from the state in FIG. 6(A) is shown. A case where the front and right directions of player object 150 are dead ends and the passage continues to the left is shown here. An image obtained by shooting with virtual camera 100, a situation before player object 150 moves in FIG. 5, is shown.

Referring to FIG. 6(C), such a state that player object 150 makes a turn to the left is shown here. An image obtained by shooting with virtual camera 100, a situation after player object 150 in FIG. 5 moved, is shown. In the present embodiment, though the direction of shooting of the virtual camera gradually follows the orientation or the direction of movement of player object 150, in this situation, when viewed from virtual camera 100, player object 150 is hidden by the wall object representing topographic object 160 and hence the degree of following is increased for following. It is noted that an image in a case where the direction of shooting of virtual camera 100 matches with the orientation or the direction of movement of player object 150 over time is shown here.

Figure 7:
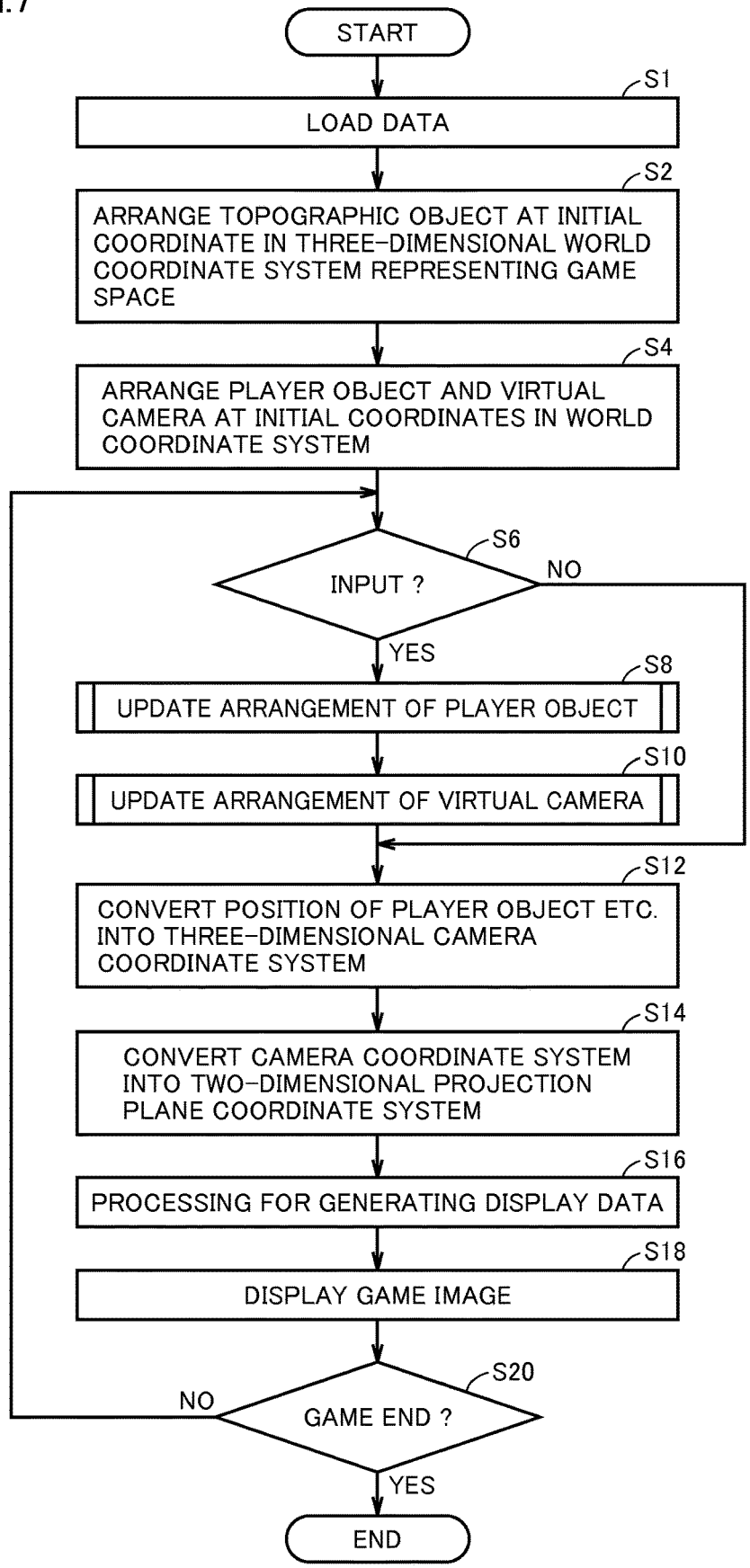
FIG. 7 shows an exemplary illustrative non-limiting flowchart of performed processing for displaying a game picture according to the exemplary embodiment.

FIG. 7 is a flowchart of performed processing for displaying a game picture according to the embodiment. The processing is processing performed mainly by CPU 40 and GPU 42*b*.

Referring to FIG. 7, initially, data or the like read from optical disc 18 by data load processing unit 200 is loaded to external main memory 46 or internal main memory 42*e* as necessary (step S1).

Then, layout data initial setting processing unit 202 reads data on a topographic object (a ground object, a building object, a wall object, or the like) or the like loaded from external main memory 46 or internal main memory 42*e* and arranges the topographic object at the initial coordinate in the three-dimensional world coordinate system representing the game space as shown in FIG. 5 (step S2).

In addition, layout data initial setting processing unit 202 arranges player object 150 at the initial coordinate in the same world coordinate system. Moreover, it arranges virtual camera 100 at the initial coordinate in the world coordinate system (step S4).

Then, controller input processing unit 204 determines whether input unit 26 of controller 22 (FIGS. 1 and 3) has been operated or not, that is, whether an input has been provided from controller 22 through wireless controller module 52 or not (step S6).

When there is a controller input (YES in step S6), controller input processing unit 204 outputs the operation input data to player object control processing unit 210.

Then, player object control processing unit 210 updates arrangement of the player object (step S8). Processing for updating arrangement of the player object will be described later.

Then, virtual camera control processing unit 220 updates arrangement of the virtual camera in accordance with updated arrangement of the player object updated in step S8 (step S10). Processing for updating arrangement of the virtual camera will be described later.

When controller input processing unit 204 determines that there was no input from controller 22 (NO in step S6), step S8 and step S10 are skipped and the process proceeds to next processing. Namely, in this case, the player object does not move.

Then, camera coordinate system conversion processing unit 232 in data generation processing unit 230 converts the position of the topographic object, the player object, or the like into the three-dimensional camera coordinate system with the position of the arranged virtual camera serving as the reference (step S12).

Then, projection plane coordinate system conversion processing unit 234 in data generation processing unit 230 converts the resultant three-dimensional camera coordinate system into the two-dimensional projection plane coordinate system (step S14). At this time, designation of a texture, clipping (cutting of an invisible world), or the like is also carried out. Thus, two-dimensional image data obtained by shooting the player object or the like with the virtual camera can be obtained.

Then, display data generation processing unit 236 in data generation processing unit 230 performs processing for generating display data serving as a game image (step S16).

Then, game device 12 outputs the display data to monitor 34 and displays the game image (step S18).

Then, whether the game has ended or not is determined (step S20). When the game is not to end, the process returns to step S6.

On the other hand, when the game has ended, the process ends (end).

Figure 8:
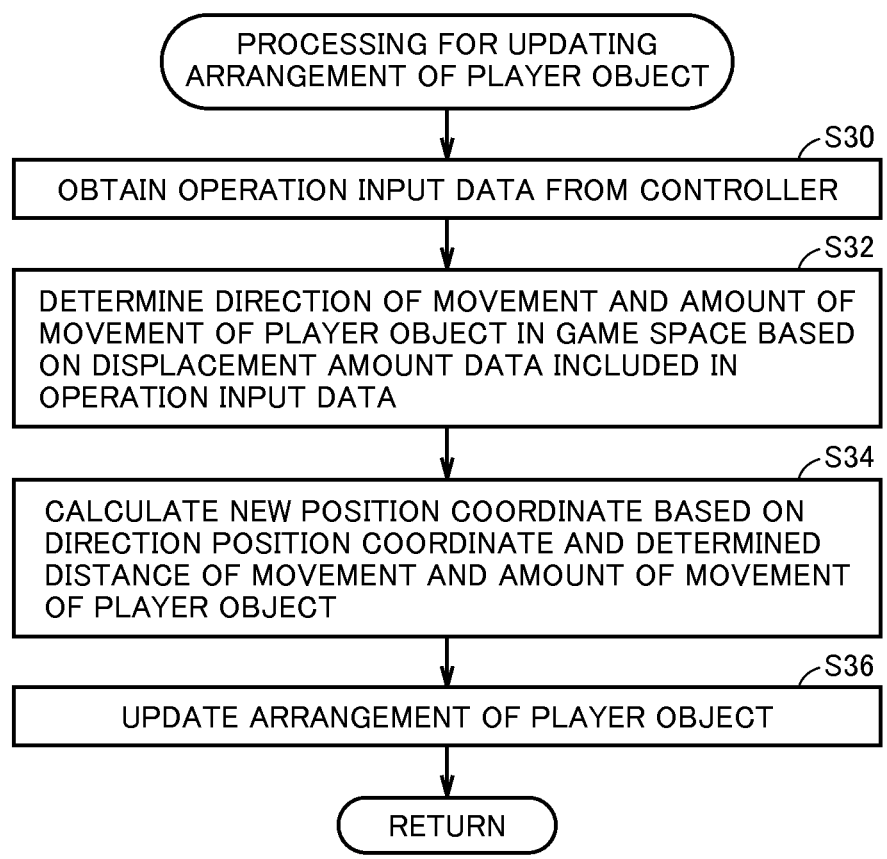
FIG. 8 shows an exemplary illustrative non-limiting flowchart for illustrating a sub routine of processing for updating arrangement of a player object according to the exemplary embodiment.

FIG. 8 is a flowchart for illustrating a sub routine of processing for updating arrangement of the player object according to the embodiment. The processing is processing performed by player object control processing unit 210.

Referring to FIG. 8, initially, operation input data from controller 22 is obtained (step S30).

As described above, cross key 26*a* is provided in controller 22, and in the present example, in order to determine a direction of movement and an amount of movement, that is, a movement position, of the player object, the player object is moved in accordance with cross key 26*a*. The operation input data is provided as data of an amount of displacement in two axes of cross key 26*a*, i.e., the horizontal axis (the X axis) and the vertical axis (the Y axis).

Then, player object direction determination processing unit 212 and player object movement amount determination processing unit 214 determine the direction of movement and the amount of movement of the player object based on the displacement amount data in the operation input data (step S32).

Then, player object arrangement change processing unit 216 calculates a new position coordinate from the current position coordinate of the player object based on the determined direction of movement and amount of movement of the player object (step S34).

Then, player object arrangement change processing unit 216 arranges the player object in the determined orientation at the calculated new position coordinate followed by updating (step S36).

Then, the process ends (return).

Thus, in response to an input from controller 22, player object control processing unit 210 updates arrangement (the position and the orientation) of the player object.

Figure 9:
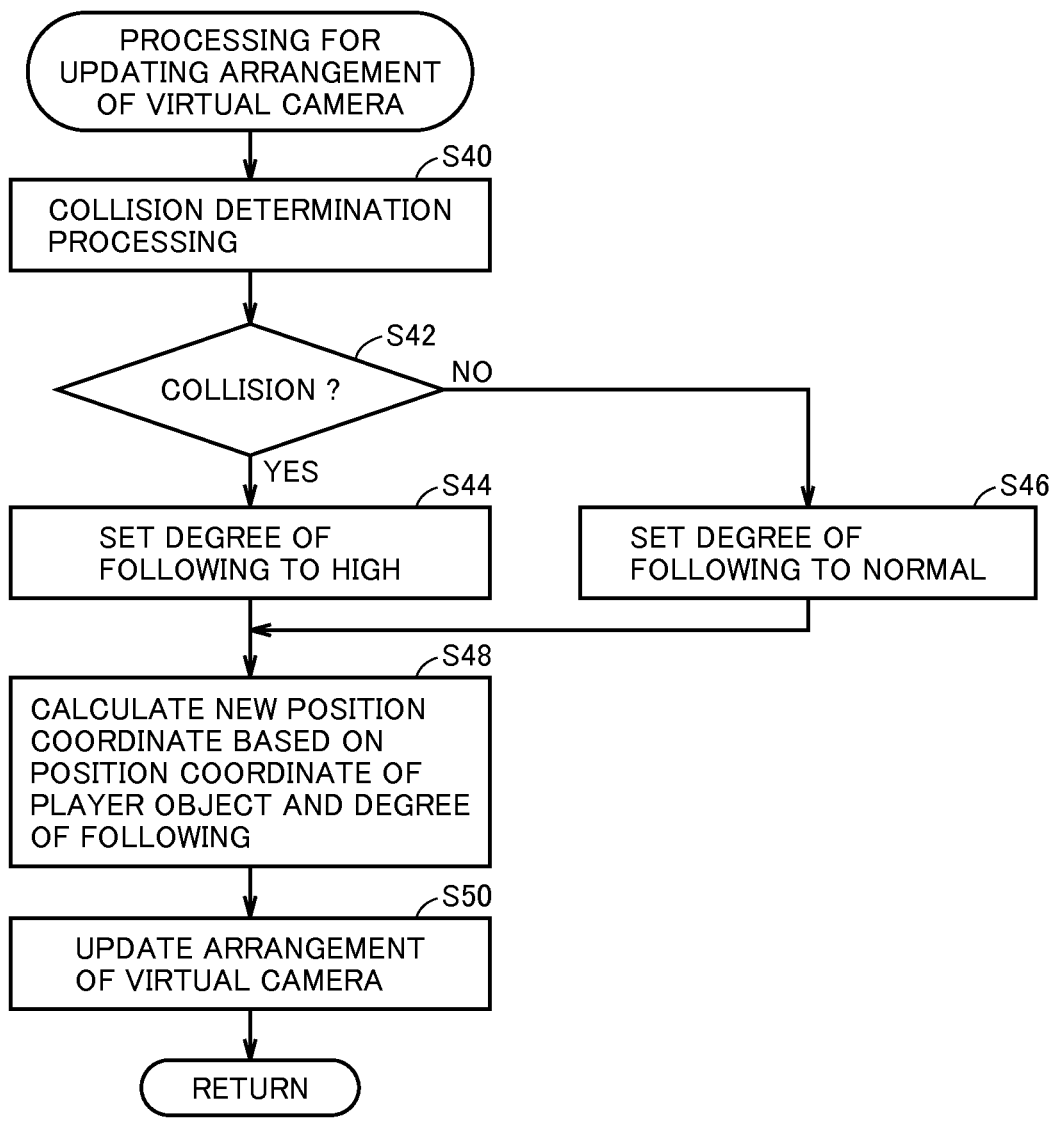
FIG. 9 shows an exemplary illustrative non-limiting flowchart for illustrating a sub routine of processing for updating arrangement of a virtual camera according to the exemplary embodiment.

FIG. 9 is a flowchart for illustrating a sub routine of processing for updating arrangement of the virtual camera according to the embodiment. The processing is processing performed by virtual camera control processing unit 220.

Referring to FIG. 9, initially, collision determination processing unit 222 performs collision determination processing (step S40).

Figure 10:
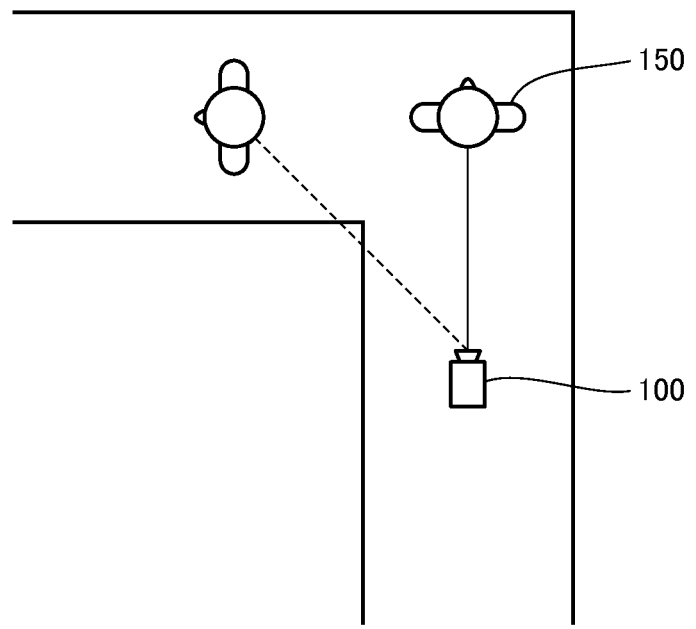
FIG. 10 shows an exemplary illustrative non-limiting conceptual diagram for illustrating collision determination processing according to the exemplary embodiment.

FIG. 10 is a conceptual diagram for illustrating collision determination processing according to the embodiment.

Referring to FIG. 10, with regard to player object 150, in a case where player object 150 is moved and arranged at a new position coordinate, whether or not player object 150 is hidden by another object when viewed from virtual camera 100 is determined. Specifically, whether or not another object (a topographic object) is present between the new position coordinate of player object 150 and the position coordinate of virtual camera 100 is determined.

In the present example, a case where a wall object representing one of topographic objects is present between the new position coordinate of player object 150 and the position coordinate of virtual camera 100 is shown. Therefore, in this case, it is determined that collision occurs.

Referring again to FIG. 9, when collision determination processing unit 222 determines in step S40 that collision occurs (YES in step S41), it outputs the result to degree-of-following adjustment processing unit 224. Degree-of-following adjustment processing unit 224 increases a degree of causing the direction of shooting of virtual 20 camera 100 to follow the orientation or the direction of movement of player object 150. Specifically, the degree of following is set to high (step S44).

On the other hand, when collision determination processing unit 222 determines in step S40 that collision does not occur (NO in step S42), it outputs the result to degree-of-following adjustment processing unit 224. Degree-of-following adjustment 25 processing unit 224 maintains the degree of causing the direction of shooting of virtual camera 100 to follow the orientation or the direction of movement of player object 150 in a normal state. Specifically, the degree of following is set to normal (step S46).

Then, virtual camera arrangement change processing unit 228 calculates a new position coordinate of the virtual camera based on the position coordinate of the player object and the degree of following of the virtual camera (step S48). Calculation of the position coordinate will be described later.

Then, virtual camera arrangement change processing unit 228 arranges the virtual camera in the determined orientation at the calculated new position coordinate followed by updating (step S50).

Then, the process ends (return).

Thus, virtual camera control processing unit 220 updates arrangement (the position and the orientation) of the virtual camera in accordance with movement of the player object.

It is noted that processing for updating arrangement of the virtual camera may be performed when a distance between a new position coordinate of player object 150 and the position coordinate of the virtual camera is equal to or greater than a constant distance L. Specifically, in a case where player object 150 makes change in direction and moves backward, that is, in a case where a distance between a new position coordinate of player object 150 and the position coordinate of the virtual camera is smaller than constant distance L, it is also possible not to change arrangement of the virtual camera. By doing so, the user can readily grasp the direction of movement of player object 150 and operability of player object 150 can be improved.

It is noted that collision determination processing may be performed again based on the new position coordinate of player object 150 and the updated position coordinate of the virtual camera. In this case, when it is determined that collision occurs, updated arrangement of the virtual camera may be updated further again so as to avoid collision.

Figure 11:
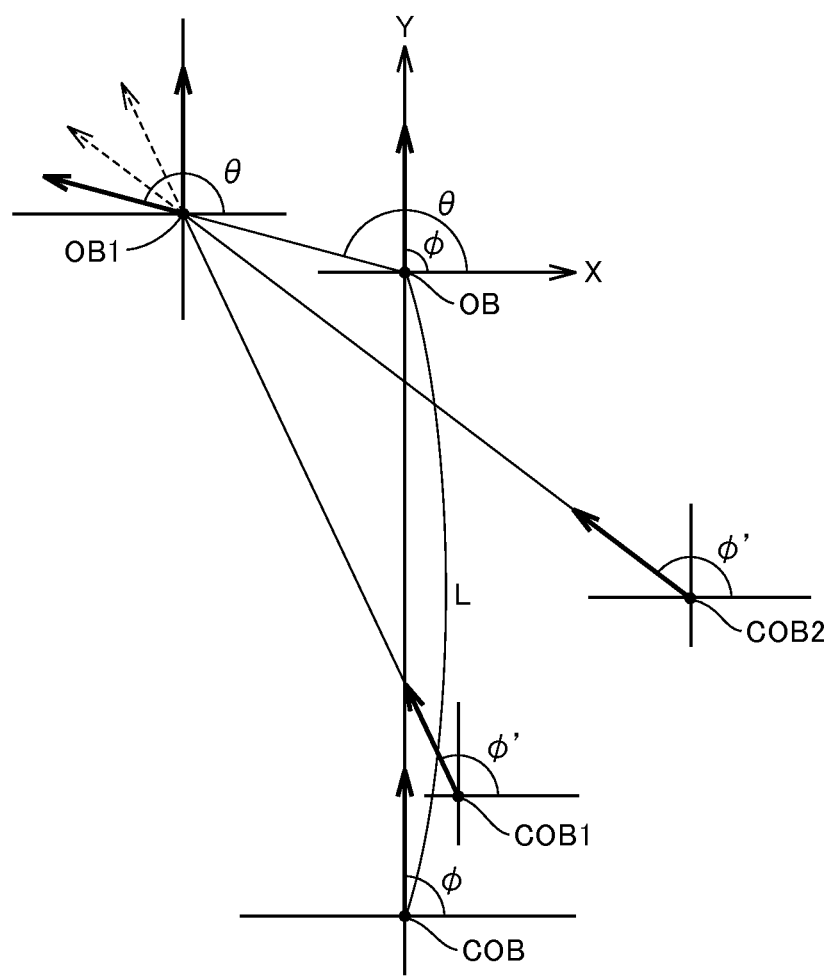
FIG. 11 shows an exemplary illustrative non-limiting diagram for illustrating calculation of a position coordinate of the virtual camera according to the exemplary embodiment.

FIG. 11 is a diagram for illustrating calculation of a position coordinate of the virtual camera according to the embodiment.

Referring to FIG. 11, in the present example, the direction of shooting of the virtual camera is determined such that it gradually follows the orientation or the direction of movement of the player object.

A case where the player object moves from a position coordinate OB to a position coordinate OB1 is shown here by way of example. In addition, a case where the orientation or the direction of movement of the player object is changed from an angle $\phi$ to an angle $\theta$ with the x axis direction serving as the reference is shown. It is assumed that the orientation or the direction of movement of the virtual camera in a case where the player object has been arranged at position coordinate OB was set to angle $\phi$.

In the present embodiment, the direction of shooting of the virtual camera is determined as following the orientation or the direction of movement of the player object. It is noted that a distance between the player object and the virtual camera is set to constant distance L. By setting the constant distance, a feeling of distance from the object present in the three-dimensional space shot with the virtual camera does not change. Therefore, such a feeling as if the field of view of the player object were constant is obtained and realism can be increased.

Specifically, an angle $\phi'$ representing the direction of shooting of the virtual camera to be changed is determined in accordance with an aimed angle (a target angle) $\theta$, current angle $\phi$, and the degree of following. In the present example, the degree of following is indicated as a coefficient of following used for causing the angle to follow aimed angle (target angle) $\theta$ from current angle $\phi$ by way of example.

In the present example, by way of example, angle $\phi'$ is set to $(\theta-\phi)\times$coefficient of following$+\phi$.

In the present example, two types of coefficients of following r1, r1 (>r0) are provided.

Coefficient of following r0 corresponds to a case where the degree of following is normal. Coefficient of following r1 corresponds to a case where the degree of following is high.

Thus, arrangement, that is, the position and the direction of shooting, of the virtual camera is uniquely determined based on position coordinate OB1 after movement of the player object, constant distance L between the player object and the virtual camera, and angle $\phi'$.

In the present example, a case where the virtual camera is arranged at a position coordinate COB1 in accordance with coefficient of following r0 and a case where the virtual camera is arranged at a position coordinate COB2 in accordance with coefficient of following r1 are shown.

With this scheme, the direction of shooting of the virtual camera is determined to gradually follow the orientation or the direction of movement of the player object.

In addition, coefficient of following r1 is desirably set to such an appropriate value that the player object is not hidden by another object when viewed from the virtual camera updated and arranged when angle φ' is determined in accordance with that coefficient of following.

With the processing according to the embodiment, the virtual camera is arranged such that the player object is not hidden in the virtual game space. Specifically, in causing the direction of shooting of the virtual camera to gradually follow the orientation or the direction of movement of the player object to be operated, if the player object may be hidden, the degree of following will be adjusted (increased) so as to maintain such a state that the player object is always displayed. In addition, in the present example, the direction of shooting of the virtual camera is caused to gradually follow the orientation or the direction of movement of the player object. Namely, by changing the direction of shooting in which the virtual camera shoots the player object in accordance with the direction in which the line of sight of the player object gradually changes as the operated player object moves, a video image in accordance with change in line of sight of the player object is displayed. Therefore, a game operation in the line of sight of the player object can be performed, realism can be increased, and zest of the game can be enhanced.

In addition, since the direction of shooting of the virtual camera is determined with the degree of causing the direction of shooting of the virtual camera to follow the orientation or the direction of movement of the player object being increased, there is no abruptness in control of the virtual camera in such a situation that the player object is hidden by another object (for example, a wall object) and operability is good. Moreover, since the direction of shooting of the virtual camera follows the orientation or the direction of movement of the player object, the orientation or the direction of movement of the player object matches with a direction of depth of a screen and hence operability is good also in this sense.

Figure 12:
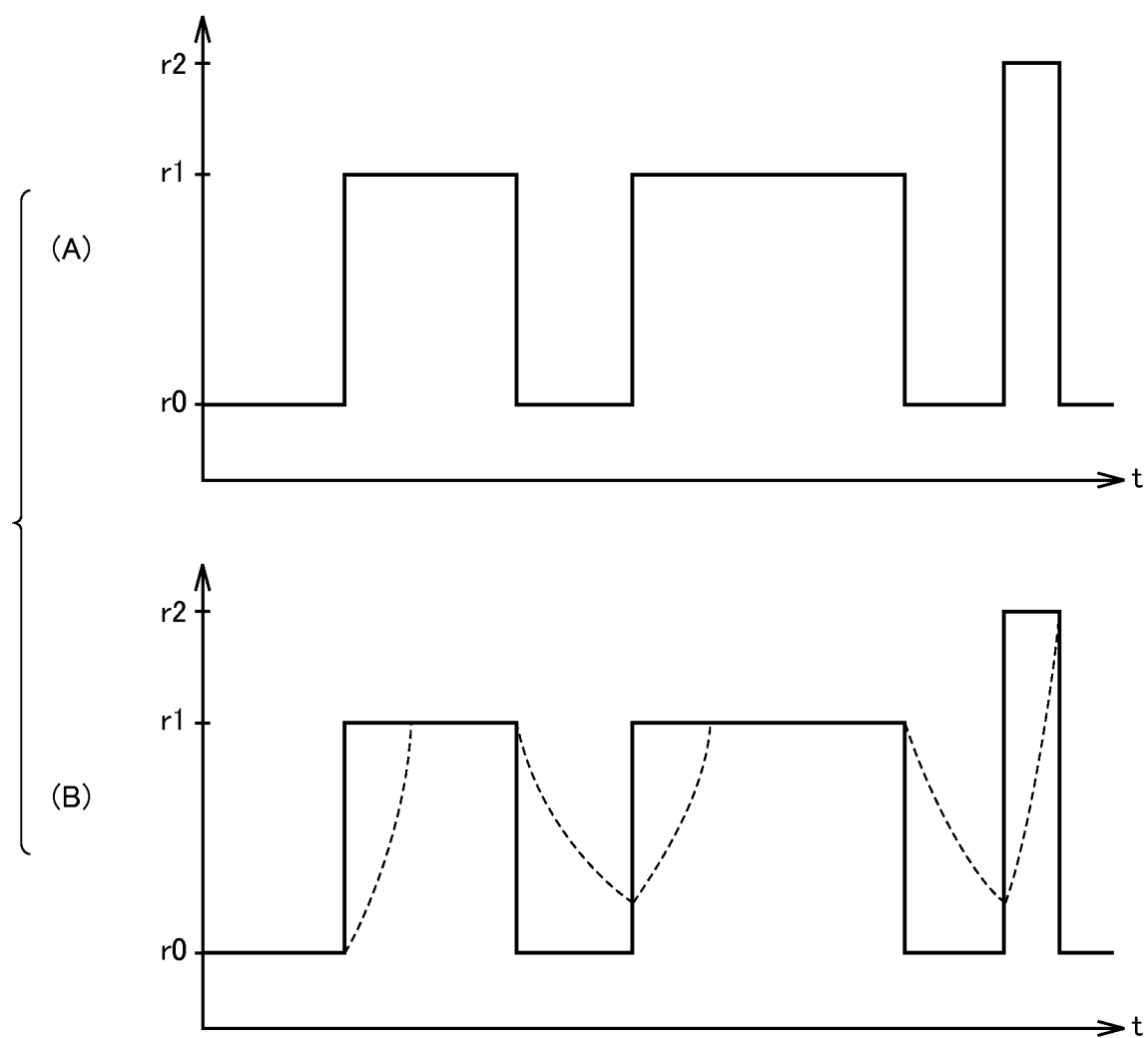
FIG. 12 shows an exemplary illustrative non-limiting diagram for illustrating change in degree of following according to the exemplary embodiment.

FIG. 12 is a diagram for illustrating change in degree of following according to the embodiment.

Referring to FIG. 12(A), change in coefficient of following indicating a degree of following the orientation or the direction of movement of the player object (a degree of following) is shown. Here, three types of coefficients of following of r0, r1, r2 (>r1) are set.

When the degree of following is normal, the coefficient of following is set to r0.

When it is determined in the collision determination processing that collision occurs, the degree of following is changed to high. In the present example, the coefficient of following is set to r1. Then, the coefficient of following is again set to r0. Then, when collision again occurs, the degree of following is set to high. By changing the degree of causing the direction of shooting of the virtual camera to follow the orientation or the direction of movement of the player object by changing the degree of following, such a situation that the player object is hidden by another object when viewed from the virtual camera can be avoided.

In addition, a case where the coefficient of following is set to r2 under a prescribed condition is shown. The prescribed condition in the present example corresponds to a case where the up direction of cross key 26a of controller 22 is input. Specifically, input direction determination processing unit 206 in controller input processing unit 204 determines whether or not the up direction of cross key 26a of controller 22 has been input, in accordance with the displacement amount data in the operation input data.

Figure 13:
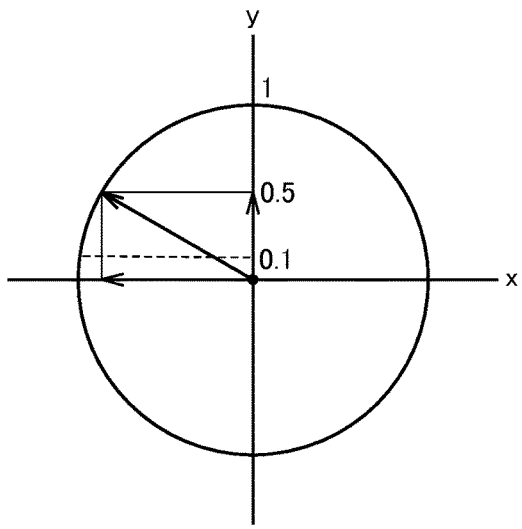
FIG. 13 shows an exemplary illustrative non-limiting diagram for illustrating relation between an operation input with a cross key and displacement amount data according to the exemplary embodiment.

FIG. 13 is a diagram for illustrating relation between an operation input with the cross key and the displacement amount data according to the embodiment.

Referring to FIG. 13, calculation of displacement amount data in a case where a direction of pressing of the cross key is between the up direction and the left direction will be described.

Specifically, when it is determined that an amount of displacement on the vertical axis (the y axis) exceeds a threshold value 0.1 with the amount of displacement 1 serving as the reference, it is determined that input of the up direction (displacement amount data y=1) has been made. In addition, when it is determined that an amount of displacement on the horizontal axis (the x axis) is smaller than −0.1, it is determined that input of the left direction (displacement amount data x=−1) has been made. Moreover, when it is determined that an amount of displacement on the vertical axis (the y axis) is smaller than −0.1, it is determined that input of the down direction (displacement amount data y=−1) has been made. Further, when it is determined that an amount of displacement on the horizontal axis (the x axis) is greater than 0.1, it is determined that input of the right direction (displacement amount data x=1) has been made.

Therefore, in that case, it is determined that input of a direction between the up direction and the left direction has been provided. Namely, it is assumed that the displacement amount data (x, y) in the operation input data is input as (−1, 1) to input direction determination processing unit 206.

Though a case where comparison with the threshold value 0.1 or −0.1 for the amount of displacement on the x axis and the y axis is made has been described here, the threshold value is by way of example and another value can also naturally be set.

Figure 14:
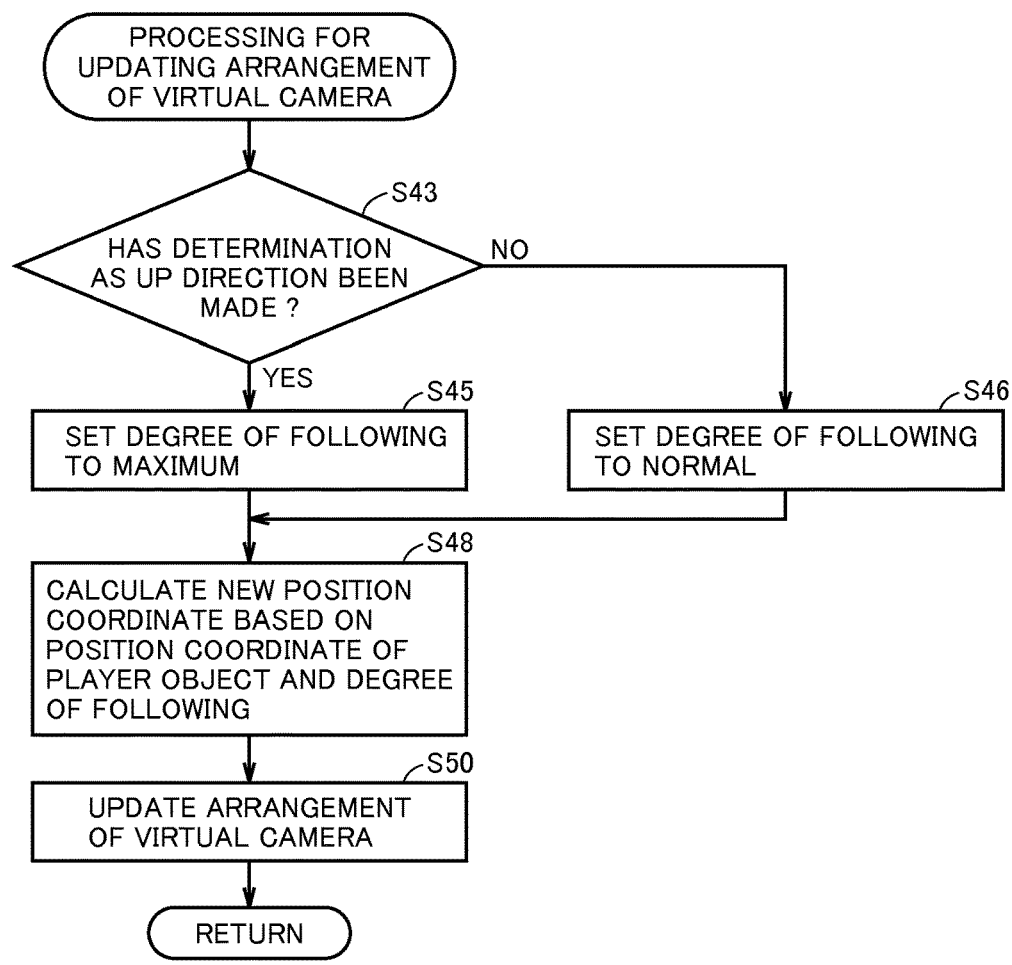
FIG. 14 shows an exemplary illustrative non-limiting flowchart for illustrating a sub routine of processing for updating arrangement of a virtual camera under a prescribed condition according to the exemplary embodiment.

FIG. 14 is a flowchart for illustrating a sub routine of processing for updating arrangement of the virtual camera under a prescribed condition according to the embodiment. The processing is processing performed by virtual camera control processing unit 220.

Referring to FIG. 14, degree-of-following adjustment processing unit 224 determines whether determination as the up direction has been made or not (step S43). As described above, input direction determination processing unit 206 can determine whether the up direction has been input or not based on a value on the y axis in the displacement amount data. Then, when it is determined that input of the up direction has been provided, the result of determination is output to degree-of-following adjustment processing unit 224. Determination as the up direction here is made based on whether or not determination as the up direction has been made by input direction determination processing unit 206.

When it is determined that determination as the up direction has been made by input direction determination processing unit 206 (YES in step S43), degree-of-following adjustment processing unit 224 increases the degree of causing the direction of shooting of virtual camera 100 to follow the orientation or the direction of movement of player object 150. Specifically, the degree of following is set to maximum (step S45). Specifically, in the present example, the coefficient of following is set to r2 (>r1) as the degree of following.

On the other hand, when it is determined in step S43 that determination as the up direction has not been made by input direction determination processing unit 206 (NO in step S43), degree-of-following adjustment processing unit 224 maintains the degree of causing the direction of shooting of virtual camera 100 to follow the orientation or the direction of movement of player object 150 in a normal state. Specifically, the degree of following is set to normal (step S46).

Though a case where the degree of following is increased when determination as the up direction is made by input direction determination processing unit 206 has been described in the present example, the example is not limited as such. For example, input of the down direction may be determined by input direction determination processing unit 206. Then, when such determination is made, degree-of-following adjustment processing unit 224 may decrease the degree of following. More specifically, the coefficient of following may be set to r3 (0<r3<r0).

Then, virtual camera arrangement change processing unit 228 calculates a new position coordinate of the virtual camera based on the position coordinate of the player object and the degree of following of the virtual camera (step S48). Since subsequent processing is the same as described with reference to FIG. 9, detailed description thereof will not be repeated.

Namely, when the up direction of cross key 26a of controller 22 is input, the direction of shooting of the virtual camera is caused to follow the orientation or the direction of movement of the player object in accordance with coefficient of following r2.

The coefficient of following is set to r2 also when the orientation or the direction of movement of the player object is the same as the direction of shooting of the virtual camera. It is noted that change in coefficient of following is not reflected if there is no difference between the aimed angle and the current angle.

On the other hand, for example, in a case where player object 150 makes a turn to the left at the corner of the wall object and further moves forward which is the direction of movement as shown in FIG. 5, for example, when the up direction is input after the left direction of cross key 26a is input, the coefficient of following is set to r2. With this change in coefficient of following, the degree of following further increases and the direction of shooting of the virtual camera will soon be in the orientation matching with the orientation or the direction of movement of the player object.

In addition, also in a case where movement in the forward direction is made while the orientation or the direction of movement is switched such as input of a direction between the up direction and the left direction as in the case of the operation input in FIG. 13, by setting the coefficient of following to r2, the direction of shooting of the virtual camera will soon be in the orientation matching with the orientation or the direction of movement of the player object.

Namely, in a case of a user's operation to intend forward movement with respect to the current orientation or direction of movement of the player object (including obliquely forward movement), the direction of shooting of the virtual camera is soon set to the orientation or the direction of movement of the player object, so that an image in the forward direction along the orientation or the direction of movement of the player object can quickly be checked and hence user's operability can further be improved. In addition, since the direction of shooting of the virtual camera soon follows the orientation or the direction of movement of the player object in accordance with the intention of the player object to movement forward, the line of sight of the player object matches with the direction of shooting of the virtual camera sooner and hence realism can be increased.

Though a case where whether the up direction of cross key 26a is input as a prescribed direction or not is determined by input direction determination processing unit 206 above and then the coefficient of following is adjusted based on that determination result has been described in the present example, whether input of a prescribed button or the like is provided or not may be determined, without limited to the input direction.

Further, even when collision occurs, it is also possible, in combination with the collision determination processing, to set the coefficient of following to r2 and to update arrangement of the virtual camera when input direction determination processing unit 206 determines that input of the up direction of cross key 26a defined as the prescribed direction has been provided.

Referring to FIG. 12(B), a case where change in coefficient of following r0, r1, r2 is interpolated is shown here.

Change in degree of following is smoothened by smoothening rise or fall of change in coefficient of following to smoothly change the coefficient of following through interpolation. As a result of this processing, change in direction of shooting of the virtual camera can further be made smooth, so that a video image further less in uncomfortableness can be displayed and realism can be increased. It is assumed that processing for interpolating the coefficient of following is performed by interpolation processing unit 226 in degree-of-following adjustment processing unit 224.

Though a case where three types of coefficients of following are set has been described in the present example, the coefficient of following is not particularly limited to such types and a greater number of coefficients of following may be provided. For example, such a coefficient of following as lower than coefficient of following r0 or higher than coefficient of following r2 in accordance with a situation of a game can be employed, so that the user can also recognize change in situation, user's expectation can be enhanced, and thus zest of the game can be enhanced.

Figure 15:
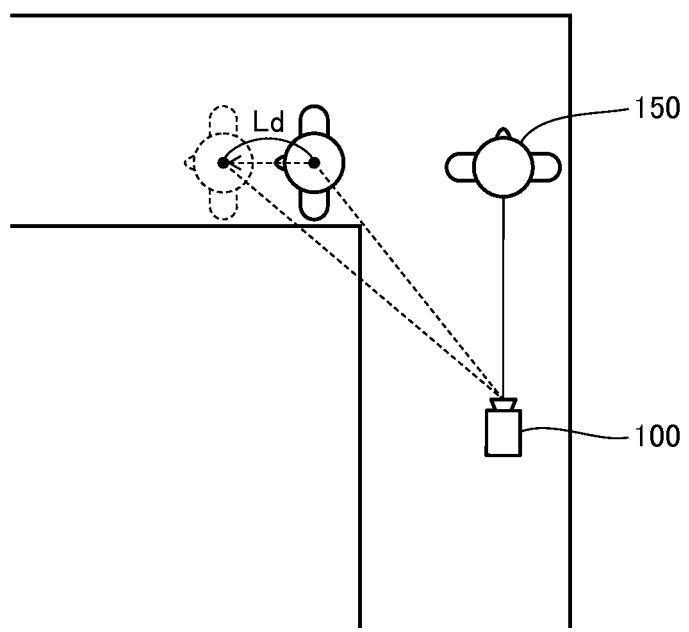
FIG. 15 shows an exemplary illustrative non-limiting conceptual diagram for illustrating other collision determination processing according to the exemplary embodiment.

FIG. 15 is a conceptual diagram for illustrating other collision determination processing according to the embodiment.

Referring to FIG. 15, with regard to player object 150, a case where a wall object representing one of topographic objects is not present between a new position coordinate of player object 150 and a position coordinate of virtual camera 100 in a case where player object 150 is moved and arranged at a new position coordinate is shown here.

On the other hand, a case where determination as collision is made in the processing for determining collision with a topographic object when player object 150 moves further to a next position is shown.

In the present example, whether or not another object (topographic object) may be present between a position coordinate of virtual camera 100 and a position coordinate resulting from movement by a prescribed distance Ld in accordance with the orientation or the direction of movement of player object 150 based on prediction of movement of player object 150 in accordance with the orientation or the direction of movement of player object 150 in a case where player object 150 is moved and arranged at a new position coordinate, that is, whether or not the player object moved to a predicted position may be hidden by another object when viewed from the virtual camera, is determined.

Collision determination can be predicted in advance by performing collision determination processing based on the position coordinate of virtual camera 100 and the position resulting from movement by a prescribed distance based on prediction of movement of player object 150 in accordance with the orientation or the direction of movement of player object 150.

It is assumed that the processing for predicting movement in accordance with the orientation or the direction of movement of the player object is performed by player object prediction processing unit 218 in player object arrangement change processing unit 216. Then, the predicted position coordinate is output to collision determination processing unit 222 and then the collision determination processing described above is performed.

By predicting collision determination through the processing and reflecting the result thereof, timing to change the degree of following can be earlier and shooting by the virtual camera corresponding to movement of player object 150 can be achieved. Namely, since arrangement of the virtual camera is updated to a position where hiding is avoided before a situation of being hidden is brought about, a good field of view in the direction of shooting from the virtual camera can always be ensured and realism can be increased.

The "prescribed distance" above is preferably changed in accordance with a moving speed of player object 150. More specifically, when the moving speed of player object 150 is fast, this "prescribed distance" is preferably increased.

By smoothly changing the coefficient of following with prediction of collision determination in combination with interpolation processing described above, the direction of shooting of the virtual camera can smoothly be changed in accordance with movement of player object 150 and a video image further less in uncomfortableness can be displayed.

Though such processing that player object control processing unit 210 changes arrangement of the player object in accordance with the operation input data from the controller input has been described in the present example, such a game that a player object automatically moves because motion of the player object (an orientation or a direction of movement) is programmed in advance, instead of the player object being moved based on a controller input, is similarly applicable. In addition, a case where an orientation of a player object is controlled by a controller input or automatically controlled by programming and thereafter the direction of movement of the player object is caused to follow that orientation to thereby move the player object is also similarly applicable. Moreover, such a game that a player object automatically moves in accordance with an orientation or a direction of movement of the player object as in forced scrolling and a controller input is accepted when the orientation or the direction of movement is to be changed is also similarly applicable.

Further, though a case where cross key 26a of input unit 26 is operated as a controller input has been described in the present example by way of example, the example is not particularly limited thereto and other unit such as controller 22 itself being moved can also move the player object in a different direction.

Furthermore, not only a case of operating a player object by operating, for example, cross key 26a which is single input unit 26 but also operation of a player object in combination with another input unit (such as A button 26d) are also possible. For example, by operating cross key 26a so as to change the orientation of the player object and then pressing A button 26d, the player object may be moved in that orientation or the direction of movement changed in accordance with that orientation.

Though a case where a coefficient of following used for causing a current angle to follow a target angle is changed has been described in the present example as a case of mainly adjusting a degree of following an orientation or a direction of movement of a player object (a degree of following), any unit may be employed so long as a degree of following can be adjusted. For example, instead of a coefficient of following used for causing a current angle to follow a target angle, an angular velocity for causing a current angle to follow a target angle may be changed.

<Other Forms>

Though game device 12 has been exemplified as a representative example of an information processing apparatus in the embodiment described above, the information processing apparatus is not limited thereto. Namely, an application executable by a personal computer may be provided as a program. Here, the program may be incorporated as a partial function of various applications executed on the personal computer.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. An image processing apparatus which displays on a display an image obtained by shooting a first virtual object and at least one other virtual object located in a three-dimensional space, the image processing apparatus comprising:

a memory which stores a control program; and
a controller which executes the control program stored in the memory,
the controller performing:
   processing for changing an orientation or a direction of movement of the first virtual object in the three-dimensional space in a prescribed procedure and moving the first virtual object in the orientation or the direction of movement,
   processing for determining a shooting direction of a virtual camera in the three-dimensional space and moving the virtual camera in accordance with a prescribed degree of following, which represents a degree of causing the shooting direction of the virtual camera to follow the orientation or the direction of movement of the first virtual object from behind, to gradually follow the orientation or the direction of movement of the first virtual object in accordance with the processing for moving the first virtual object, and shooting the first virtual object in the shooting direction, and
   processing for generating display data for displaying on the display the image obtained by shooting the first virtual object in the three-dimensional space based on the virtual camera,
the processing for shooting the first virtual object including:
   processing for predicting a future position to which the first virtual object would be moved based upon the current orientation or the direction of movement of the first virtual object in accordance with the processing for moving the first virtual object,
   processing for determining whether the first virtual object at the predicted future position is hidden by the other virtual object when viewed from the virtual camera, and
   processing for changing the degree of following by increasing an angular velocity of following the orientation or the direction of movement of the first virtual object so that a shooting direction of the virtual camera comes close to the orientation or the direction of movement of the first virtual object when it is determined that the first virtual object at the predicted future position is hidden by the other virtual object when viewed from the virtual camera, wherein:

the increasing of the angular velocity of following includes increasing the angular velocity from a first angular velocity when the first virtual object is not hidden by the other virtual object when viewed from the virtual camera to a second angular velocity when it is determined that the first virtual object at the predicted future position is hidden by the other virtual object when viewed from the virtual camera, each of the first angular velocity and the second angular velocity having a non-zero value; and the degree of following is changed before the first object becomes hidden in the shooting direction of the virtual camera by the other virtual object such that the virtual camera is moved in a manner which prevents the first virtual object from becoming hidden in the shooting direction of the virtual camera by the other virtual object.

2. The image processing apparatus according to claim 1, wherein the processing for determining whether the first virtual object is hidden detects whether the other virtual object is located between a position of the first virtual object at the predicted future position and a position of the virtual camera when viewed from the virtual camera.

3. The image processing apparatus according to claim 1, wherein the processing for shooting the first virtual object further increases the degree of following which represents the degree of causing the shooting direction of the virtual camera to follow the orientation or the direction of movement of the first virtual object when the first virtual object moves forward.

4. The image processing apparatus according to claim 3, wherein the processing for moving the first virtual object accepts a direction input by a user and changes the orientation or the direction of movement of the first virtual object to a direction in accordance with the direction input with a current shooting direction of the virtual camera being defined as a reference.

5. The image processing apparatus according to claim 1, wherein the processing for shooting the first virtual object further includes processing for changing a position of the virtual camera based on the position and the orientation or the direction of movement of the moved first virtual object and the degree of following.

6. The image processing apparatus according to claim 5, wherein the processing for changing a position of the virtual camera changes the position of the virtual camera such that a distance from the position of the moved first virtual object is constant.

7. The image processing apparatus according to claim 1, wherein the processing for shooting the first virtual object determines the shooting direction of the virtual camera in the three-dimensional space in accordance with a first coefficient used for adjusting an angle so as to gradually follow the orientation or the direction of movement of the first virtual object, and the processing for increasing a degree of following increases the first coefficient to a second coefficient greater than the first coefficient when it is determined that the first virtual object at the predicted future position is hidden by the other virtual object when viewed from the virtual camera.

8. The image processing apparatus according to claim 7, wherein the processing for increasing a degree of following further includes coefficient interpolation processing for increasing the coefficient to a third coefficient between the first coefficient and the second coefficient when it is determined that the first virtual object at the predicted future position is hidden by the other virtual object when viewed from the virtual camera.

9. The image processing apparatus according to claim 1, wherein the processing for determining whether the first virtual object is hidden determines whether the other virtual object is located between a position distant from the position of the first virtual object by a prescribed distance in the orientation or the direction of movement of the first virtual object and a position of the virtual camera.

10. The image processing apparatus according to claim 1, wherein the processing for moving the first virtual object changes the orientation or the direction of movement of the first virtual object in accordance with an input by a user, moves the first virtual object in the orientation or the direction of movement, and moves the first virtual object without changing the orientation or the direction of movement of the first virtual object when the input by the user is a prescribed input, and the processing for shooting the first virtual object includes processing for further increasing the degree of following which represents the degree of causing the shooting direction of the virtual camera to follow the orientation or the direction of movement of the first virtual object when the input by the user is the prescribed input.

11. An image processing method for displaying on a display an image obtained by shooting a first virtual object and other virtual object located in a three-dimensional space, the image processing method comprising:

changing an orientation or a direction of movement of the first virtual object in the three-dimensional space in a prescribed procedure and moving the first virtual object in the orientation or the direction of movement;

determining a shooting direction of a virtual camera in the three-dimensional space and moving the virtual camera in accordance with a prescribed degree of following, which represents a degree of causing the shooting direction of the virtual camera to follow the orientation or the direction of movement of the first virtual object from behind, to gradually follow the orientation or the direction of movement of the first virtual object in accordance with the processing for moving the first virtual object, and shooting the first virtual object in the shooting direction; and generating display data for displaying on the display the image obtained by shooting the first virtual object in the three-dimensional space based on the virtual camera, the shooting the first virtual object including:

predicting a future position to which the first virtual object would be moved based upon the current orientation or the direction of movement of the first virtual object in accordance with the processing for moving the first virtual object, determining whether the first virtual object at the predicted future position is hidden by the other virtual object when viewed from the virtual camera, and changing the degree of following by increasing an angular velocity of following the orientation or the direction of movement of the first virtual object so that a shooting direction of the virtual camera comes close to the orientation or the direction of movement of the first virtual object when it is determined that the first virtual object at the predicted future position is hidden by the other virtual object when viewed from the virtual camera, wherein:

the increasing of the angular velocity of following includes increasing the angular velocity from a first angular velocity when the first virtual object is not hidden by the other virtual object when viewed from the virtual camera to a second angular velocity when it is determined that the first virtual object at the predicted future position is hidden by the other virtual object when viewed from the virtual camera, each of the first angular velocity and the second angular velocity having a non-zero value; and the degree of following is changed before the first object becomes hidden in the shooting direction of the virtual camera by the other virtual object such that the virtual camera is moved in a manner which prevents the first virtual object from becoming hidden in the shooting direction of the virtual camera by the other virtual object.

12. A non-transitory storage medium storing a control program for an image processing apparatus for displaying on a display an image obtained by shooting a first virtual object and other virtual object located in a three-dimensional space, the control program causing a computer to perform processing comprising:

changing an orientation or a direction of movement of the first virtual object in the three-dimensional space in a prescribed procedure and moving the first virtual object in the orientation or the direction of movement;

determining a shooting direction of a virtual camera in the three-dimensional space and moving the virtual camera in accordance with a prescribed degree of following, which represents a degree of causing the shooting direction of the virtual camera to follow the orientation or the direction of movement of the first virtual object from behind, to gradually follow the orientation or the direction of movement of the first virtual object in accordance with the processing for moving the first virtual object, and shooting the first virtual object in the shooting direction; and generating display data for displaying on the display the image obtained by shooting the first virtual object in the three-dimensional space based on the virtual camera, the shooting the first virtual object including:

predicting a future position to which the first virtual object would be moved based upon the current orientation or the direction of movement of the first virtual object in accordance with the processing for moving the first virtual object, determining whether the first virtual object at the predicted future position is hidden by the other virtual object when viewed from the virtual camera, and changing the degree of following by increasing an angular velocity of following the orientation or the direction of movement of the first virtual object so that a shooting direction of the virtual camera comes close to the orientation or the direction of movement of the first virtual object when it is determined that the first virtual object at the predicted future position is hidden by the other virtual object when viewed from the virtual camera, wherein:

the increasing of the angular velocity of following includes increasing the angular velocity from a first angular velocity when the first virtual object is not hidden by the other virtual object when viewed from the virtual camera to a second angular velocity when it is determined that the first virtual object at the predicted future position is hidden by the other virtual object when viewed from the virtual camera, each of the first angular velocity and the second angular velocity having a non-zero value; and the degree of following is changed before the first object becomes hidden in the shooting direction of the virtual camera by the other virtual object such that the virtual camera is moved in a manner which prevents the first virtual object from becoming hidden in the shooting direction of the virtual camera by the other virtual object.

13. The image processing apparatus according to claim 1, wherein the processing for increasing a degree of following increases a coefficient of following for causing the shooting direction of the virtual camera to follow the orientation or the direction of movement of the first virtual object from a first coefficient of following to a second coefficient of following when it is determined that the first virtual object at the predicted future position is hidden by the other virtual object when viewed from the virtual camera.

* * * * *